(12) United States Patent
Takechi et al.

(10) Patent No.: US 6,352,102 B1
(45) Date of Patent: Mar. 5, 2002

(54) AIR CONDITIONING APPARATUS FOR VEHICLE

(75) Inventors: Tetsuya Takechi; Toshihiko Muraki, both of Kariya; Manabu Miyata, Obu; Hideaki Inazawa, Kariya; Yasuhiro Sato, Obu; Koji Takahashi, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 08/947,454

(22) Filed: Oct. 6, 1997

(30) Foreign Application Priority Data

| Oct. 7, 1996 | (JP) | 8-266376 |
| Oct. 29, 1996 | (JP) | 8-287016 |
| Dec. 24, 1996 | (JP) | 8-343410 |
| Apr. 9, 1997 | (JP) | 9-091003 |

(51) Int. Cl.[7] ............................................. B60H 3/00
(52) U.S. Cl. ..................... 165/42; 165/43; 165/203; 165/204; 237/12.3 A; 237/12.3 B
(58) Field of Search ........................ 165/42, 43, 203, 165/204; 237/12.3 A, 12.3 B

(56) References Cited

U.S. PATENT DOCUMENTS

| 4,460,036 A | * | 7/1984 | Yoshimi et al. ............... 165/42 |
| 5,016,704 A | * | 5/1991 | Ono ............................... 165/42 |
| 5,181,553 A | * | 1/1993 | Doi ................................ 165/42 |
| 5,195,574 A | * | 3/1993 | Tanaka et al. ............... 165/203 |
| 5,309,731 A | * | 5/1994 | Nonoyama et al. ........... 62/244 |
| 5,390,728 A | * | 2/1995 | Ban ............................. 165/42 |
| 5,582,234 A | * | 12/1996 | Samukawa et al. ........... 165/43 |
| 5,725,052 A | * | 3/1998 | Kawai et al. ................ 165/203 |

FOREIGN PATENT DOCUMENTS

JP          A-5-124426          5/1993

* cited by examiner

Primary Examiner—Christopher Atkinson
(74) Attorney, Agent, or Firm—Harness, Dickey & Pierce, PLC

(57) ABSTRACT

According to the present invention, in an air conditioning apparatus setting a double laminar mode in which inside air and outside air are blown while being partitioned, when the maximum heating state (including the high heating capacity close to the maximum heating operation) is set, a warm air bypass door for introducing warm air directly into a foot opening portion, without being mixed into cool air, functions as a movable partition member for partitioning an air passage at a downstream side of a heating heat exchanger, into an inside air passage and an outside air passage. In this way, it is possible to downsize the air conditioning unit.

18 Claims, 28 Drawing Sheets

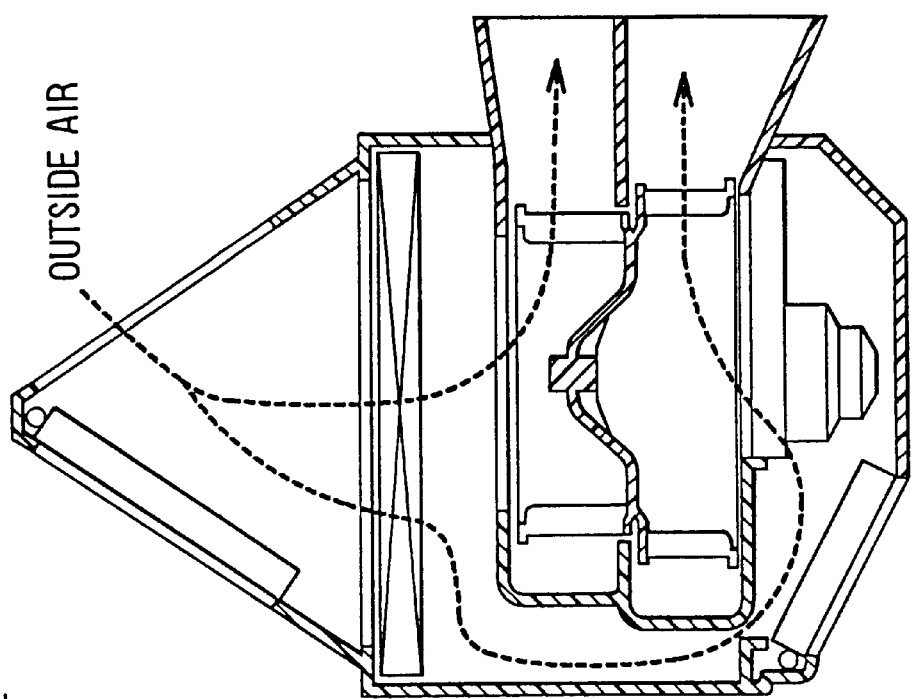
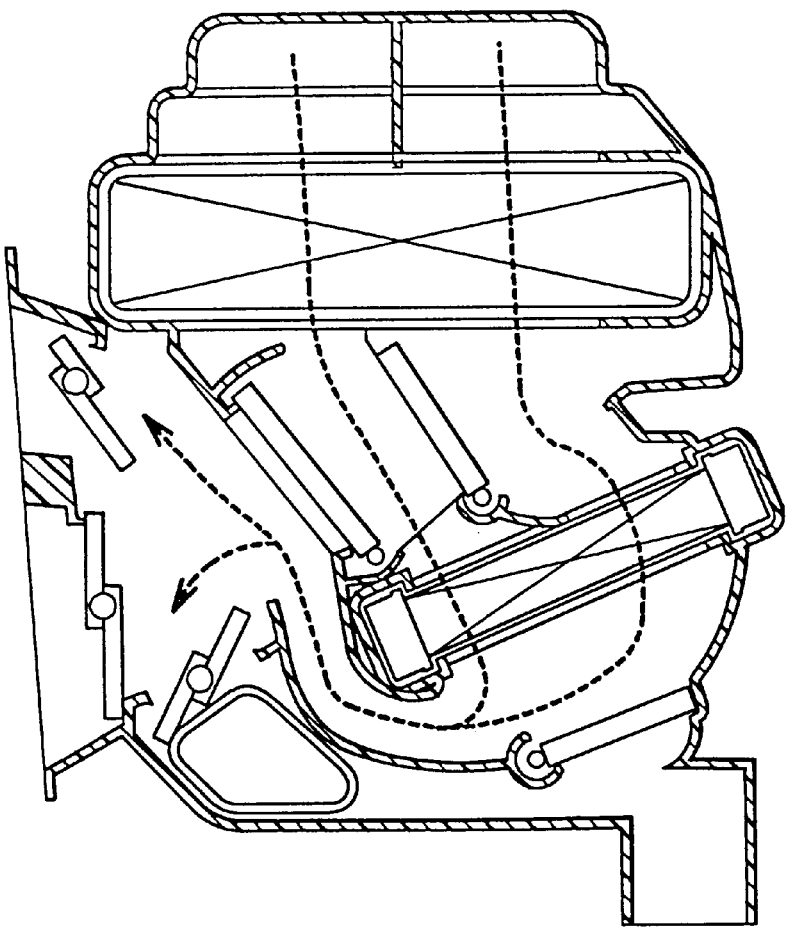
FIG.19A WHOLE OUTSIDE AIR MODE
FIG.19B OUTSIDE AIR

INSIDE AIR/OUTSIDE AIR
DOUBLE LAMINER MODE

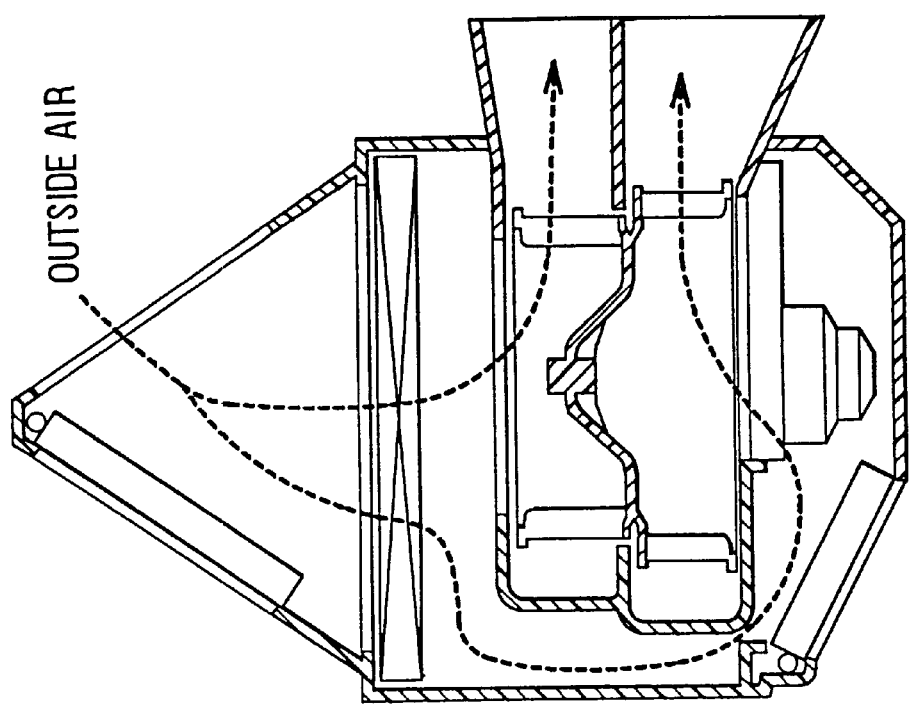
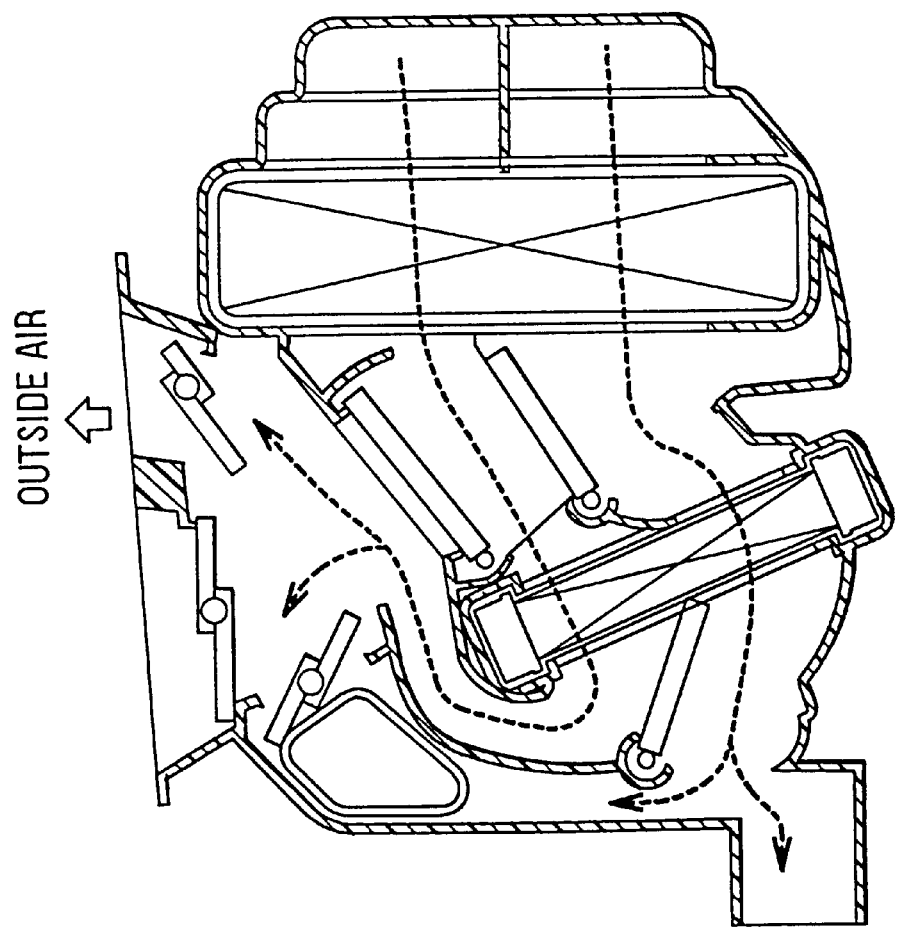
FIG. 22A
FIG. 22B

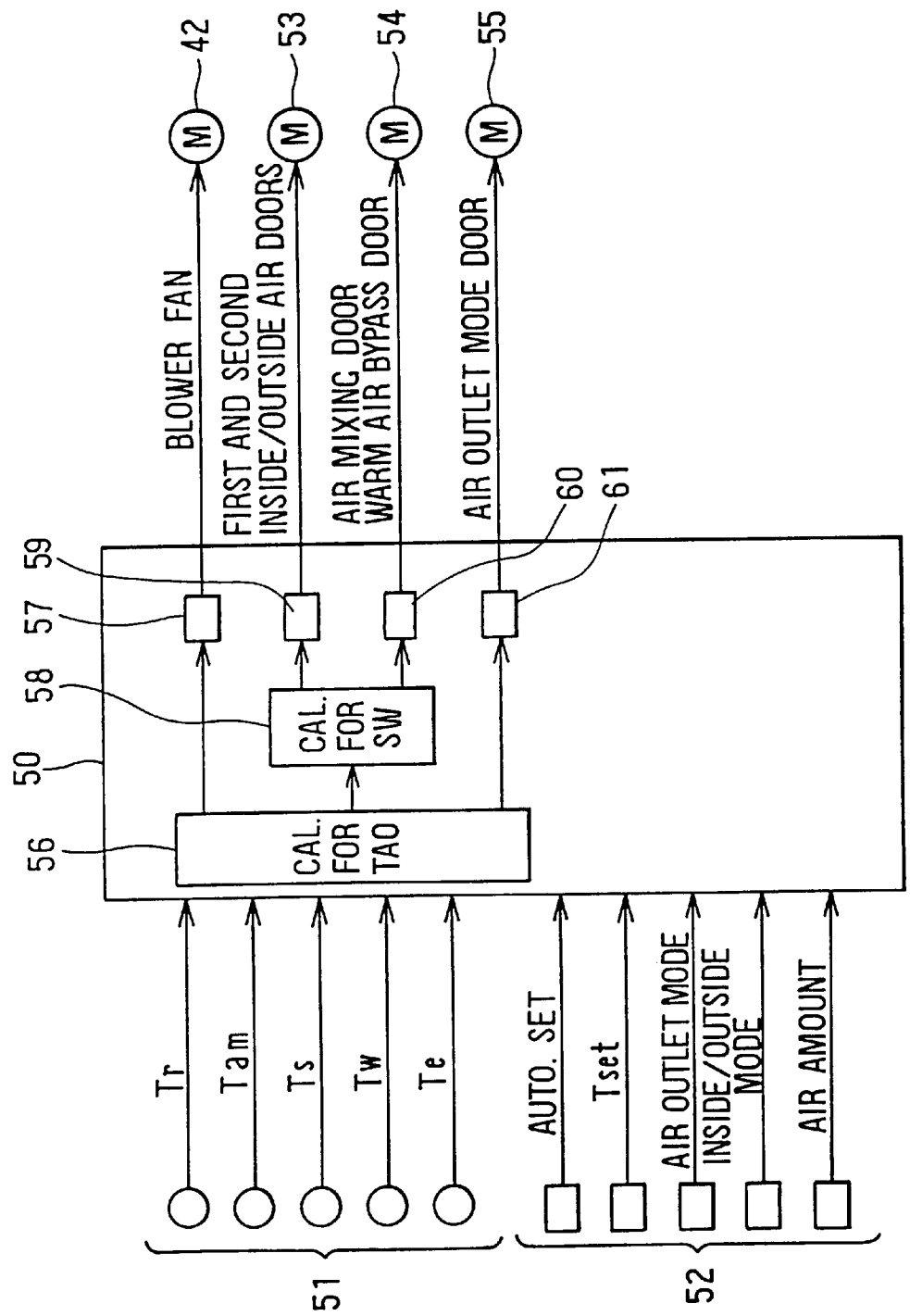

AIR CONDITIONING APPARATUS FOR VEHICLE

CROSS-REFERENCE TO RELATED APPLICATIONS

This application is based on and claims priority of Japanese Patent Applications of Nos. Hei. 8-266376 filed on Oct. 7, 1996, Hei. 8-287016, filed on Oct. 29, 1996, Hei. 8-343410 filed on Dec. 24, 1996, and Hei. 9-91003 filed on Apr. 9, 1997, the contents of which are incorporated herein by reference.

BACKGROUND OF THE INVENTION

1. Field of the Invention

This invention relates to an air conditioning apparatus, in which a passage of conditioned air is partitioned into a first air passage at a side of inside air and a second air passage at a side of outside air. A high-temperature inside air having been heated re-circulates and is blown out from a foot air outlet, and outside air having a low-humidity is blown out from a defroster air outlet, to improve a heating capacity and to defrost a windshield.

2. Description of Related Art

In a conventional air conditioning apparatus as disclosed in JP-A-5-124426, there are formed at one end side of an air conditioning case an inside-air inlet for introducing inside air and an outside-air inlet for introducing outside air and at the other end side of the air conditioning case a foot air outlet for blowing air toward a foot area, a defroster air outlet for blowing air toward an inner surface of a windshield, and a face air outlet for blowing air toward a face area.

In the air conditioning case, there is provided a partition plate for partitioning an interior of the air conditioning case into a first air passage extending from the outside-air suction port to the face air outlet and the foot air outlet and a second air passage extending from the outside-air suction port to the defroster air outlet.

Further, in each of the first and the second air passages, there are provided a heating heat exchanger, a bypass passage bypassing the heating heat exchanger, and an air mixing door. The air mixing door includes a door at a side of the first air passage, and another door at a side of the second air passage, which are integrally provided with a single rotary shaft rotatably disposed over both air passages.

When any one of the face mode, the bi-level mode, and the foot mode is selected as air outlet mode, if the inside air/outside air introduction mode is set to the inside-air circulation mode, the inside air is introduced into both air passages, whereas if the mode is set to the outside-air introduction mode, the outside air is introduced into both air passages.

Further, when the foot/defroster mode is selected as the air outlet mode, there is set an inside air/outside air double laminar mode in which the inside air is introduced into the first air passage and the outside air is introduced into the second air passage. In this way, because a passenger compartment is heated by a recirculation of the inside air which has been already heated, the heating performance is improved. Further, because the outside air having a low humidity is blown toward the windshield, it is possible to secure the defrosting performance of the windshield certainly.

In recent years, as for an air conditioning apparatus for a vehicle, in view of a limited space for being mounted on a vehicle as well as a cost reduction, a compactness of an air conditioning unit mounted on a vehicle and a simplicity of the construction have become significant problems. In the above-described prior art, it is necessary to additionally provide the partition plate for partitioning the first air passage and the second air passage in addition to the general construction elements of the air conditioning unit. As a result, the construction is complicated, the cost increases, and the air conditioning unit is large-sized to avoid an interference of the partition plate and the door members.

SUMMARY OF THE INVENTION

In view of the above-described problem, an object of the present invention is to downsize an air conditioning unit and to simplify a construction thereof, in the air conditioning apparatus for a vehicle, in which there is set a double laminar mode for partitioning inside air and outside air in an air conditioning case.

According to a first aspect of the present invention, in an air outlet mode where both of a first opening portion for blowing air toward a lower portion of a passenger compartment and a second opening portion for blowing air toward an inner surface of a windshield are opened, when the maximum heating state is set, an air passage is partitioned into a first air passage through which inside air flows and a second air passage through which outside air flows, in such a manner that the first air passage is communicated with the first opening portion, the second air passage is communicated with the second opening portion. Further, there are formed a first warm air passage for introducing the warm air having passed through a heating heat exchanger into the first and the second air opening portions and a second warm air passage for introducing the warm air having passed through the heating heat exchanger directly into the first air opening portion while bypassing the first warm air passage. An inlet portion of the second warm air passage is opened and closed by the warm air bypass door. In a double laminar mode where the first air passage and the second air passage are partitioned, the warm air bypass door is operated to a position where the inlet portion is opened and the warm air passage is partitioned into the first air passage and the second air passage.

In this way, because the warm air bypass door itself functions as a movable partition member for partitioning the inside air and the outside air, a space for providing a stationary partition member can be reduced, so that an air conditioning unit can be downsized, and a construction thereof can be simplified.

According to a second aspect of the present invention, as an air mixing door for adjusting a ratio of an amount of air passing through a heating heat exchanger and an amount of air passing through a cool air bypass passage, there are provided a main air mixing door and an auxiliary air mixing door, both of which are disposed at an air upstream side of the heating heat exchanger and operated with each other. Further, in a double laminar mode where a first air passage and a second air passage are partitioned, the main air mixing door fully closes the cool air bypass passage, and the auxiliary air mixing door partitions a space at an air upstream side of the heating heat exchanger into the first air passage and the second air passage.

In this way, because the air mixing door itself functions as a movable partition member for partitioning the inside air and the outside air, a space for providing a stationary partition member can be reduced. Further, a space for rotating two air mixing doors can be commonly used. Therefore, an air conditioning unit can be downsized, and a construction thereof can be simplified.

BRIEF DESCRIPTION OF THE DRAWINGS

Additional objects and advantages of the present invention will be more readily apparent from the following detailed description of preferred embodiments thereof when taken together with the accompanying drawings in which:

FIG. 19A is a cross sectional view of the air conditioning unit in a whole outside air mode according to the second embodiment, and FIG. 19B is a cross sectional view of the blower unit in a whole outside air mode according to the second embodiment;

FIG. 22A is a cross sectional view of the air conditioning unit in a switching process between the whole outside air mode and the double laminar mode according to the second embodiment, and FIG. 22B is a cross sectional view of the blower unit in a switching process between the whole outside air mode and the double laminar mode according to the second embodiment;

FIG. 23 is a diagram showing a system for electric control according to the second embodiment;

DETAILED DESCRIPTION OF PREFERRED EMBODIMENTS

Figure 1:
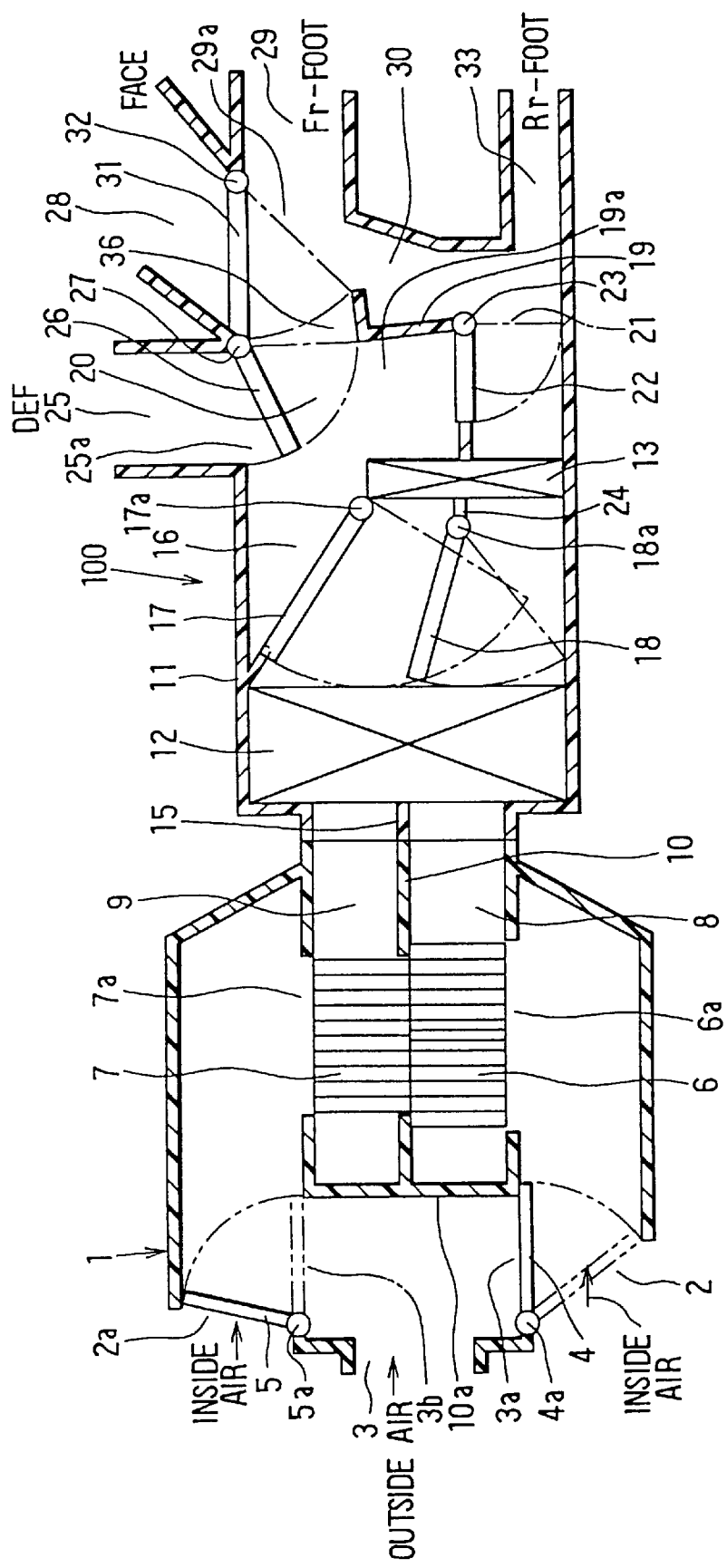
FIG. 1 is a view showing an entire construction of a ventilation system according to a first embodiment of the present invention.

Referring to the drawings, preferred embodiments of the present invention will be described.

A first embodiment of the present invention will be described with reference to FIGS. 1 and 2. In the first embodiment, the present invention is applied to an air conditioning apparatus mounted on a vehicle in which it is difficult to secure a sufficient heat source for heating operation, such as a vehicle having a diesel engine mounted thereon, an electric vehicle, and a hybrid vehicle.

Figure 2:
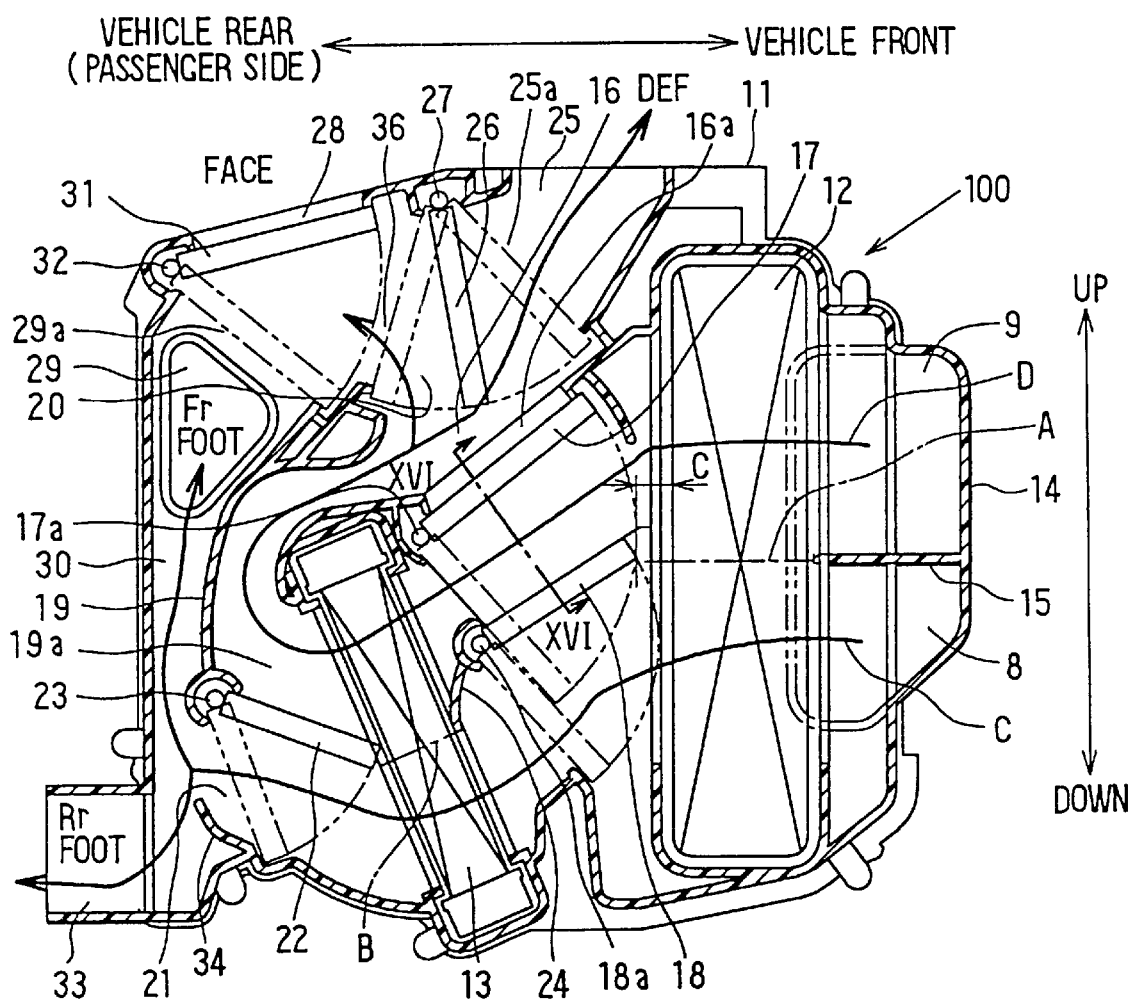
FIG. 2 is a cross sectional view of an air conditioning unit of FIG. 1.

FIG. 1 is a schematic view showing an entire construction of a ventilation system of an air conditioning apparatus, and FIG. 2 is a vertical cross section of an air-conditioning unit.

In FIG. 1, the ventilation system of the air conditioning apparatus is mainly divided into two parts of a blower unit 1 and an air conditioning unit 100. First, the blower unit 1 will be described. The blower unit 1 is disposed at a lower portion of a dashboard in a passenger compartment and at an offset position from a center portion toward a passenger's seat next to a driver's seat. The blower unit 1 is provided with a first and a second inside air introduction ports 2 and 2a for introducing inside air (air in the passenger compartment) and an outside air introduction port 3 for introducing outside air (air outside the passenger compartment). Those introduction ports 2, 2a and 3 are opened and closed by a first and a second inside air/outside air switching doors 4 and 5.

Those first and second inside air/outside air switching doors 4 and 5 are rotated with rotary shafts 4a and 5a, respectively, as a center thereof, and are operated by a link mechanism (not shown) and an actuator such as a servomotor in accordance with an inside air/outside air introduction mode control signal of the air conditioning apparatus.

In the blower unit 1, there are disposed a first (inside air) fan 6 and a second (outside air) fan 7 for blowing air introduced from the introduction ports 2, 2a, and 3. Both of fans 6 and 7 are composed of a centrifugal multi-blades fan (sirocco fan) and are rotated simultaneously by a single common electric motor (not shown).

FIG. 2 shows a state of a double laminar mode (described later). Because the first inside air/outside air switching door 4 opens the first inside air introduction port 2 and closes the outside air passage 3a from the outside air introduction port 3, the inside air is sucked into a suction port 6a of the first (inside air) fan 6. On the other hand, because the second inside air/outside air switching door 4 closes the second inside air introduction port 2a and opens the outside air passage 3b from the outside air introduction port 3, the outside air is sucked into a suction port 7a of the second (outside air) fan 7.

Therefore, in this state, the first fan 6 blows the inside air from the inside air introduction port 2 into a first (inside air) passage 8, and the second fan 7 blows the outside air from the outside air introduction port 3 into the second (outside air) passage 9. The first passage 8 and the second passage 9 are partitioned by partitioning means in the form of a partition plate 10 disposed between the first fan 4 and the second fan 5. The partition plate 10 may be integrally formed with a scroll casing 10a made of resin, for accommodating both fans 6 and 7.

In this embodiment, to secure both of an improvement of the heating capacity and a defrosting performance of the windshield in the double laminar mode, an amount of the inside air blown by the first fan 6 in the double laminar mode is set to be larger than an amount of the outside air blown by the second fan 7 in the double laminar mode.

That is, considering an air flow resistance (pressure loss) in the first passage 8 and an air flow resistance (pressure loss) in the double laminar mode, a blowing capacity of the first fan 6 and a blowing capacity of the second fan 7 are set in such a manner that the amount of the inside air blown by the first fan 6 is set to be larger than the amount of the outside air blown by the second fan 7.

More specifically, a cross sectional area of the first passage 8 is set to be larger than that of the second passage 7 to reduce the air flow resistance (pressure loss) in the second passage 9 as compared with the first passage 8, a blowing capacity of the second fan 7 in a state of a single fan unit is set to be larger than that of the first fan 6, or a ratio of the amount of the inside air is set to be larger than that of the outside air in the double laminar mode by a combination of adjustments of the air flow resistance and the blowing capacity.

As a result of experiments and examinations by the inventors, it is preferable that a ratio of the amount of the inside air and the outside air is specifically set to approximately 4.5:5.5 to secure both of the heating performance and the defrosting performance of the windshield.

Next, the air conditioning unit 100 is of a type in which both of an evaporator (cooling heat exchanger) 12 and a heater core (heating heat exchanger) 13 are integrally accommodated in a single air conditioning case 11. Hereinafter, a structure of the air conditioning unit 100 will be described specifically with reference to FIG. 2.

The air conditioning case 11 is made of resin which has an elasticity to some degree and is superior in a strength, such as ploypropylene, and is composed of right and left division cases each having an division surface in a vertical direction (up-and-down direction of the vehicle) in FIG. 2. The right and left division cases are integrally connected by fastening means such as a metal spring clip and a screw, after the heat exchangers 12 and 13, and components such as a door (described later) are accommodated therein, to construct the air conditioning case 11.

The air conditioning unit 100 is disposed at a lower side of the dashboard in the passenger compartment and substantially at a center portion in the right-and-left direction of the vehicle. In a portion of the air conditioning case 11, at the most front side of the vehicle, there is formed an air inlet 14 into which conditioned air blown by the blower unit 1 flows. The air inlet 14 is opened at a side surface of the passenger's seat to be connected to an air outlet portion of the blower unit 1 disposed in a portion at a front side of the passenger seat.

In the air conditioning case 11, there is disposed the evaporator 12 at a portion immediately after the air inlet 14 to cross whole areas of the first and second air passages 8 and 9. As being known well, the evaporator 12 is for cooling the conditioned air while absorbing an evaporation latent heat of a refrigerant of a refrigeration cycle from the conditioned air. As shown in FIG. 2, the evaporator 12 is thin in the front-and-rear direction of the vehicle and is disposed in the air conditioning case 11 in such a manner that a longitudinal direction thereof extends in the up-and-down direction of the vehicle.

An air passage extending from the air inlet 14 to the evaporator 12 is partitioned by partitioning means in the form of a partition plate 15 into the first air passage 8 at a lower side of the vehicle and the second air passage 9 at an upper side of the vehicle. The partition plate 15 is integrally formed with the air conditioning case 11 by using resin and is a stationary partition member extending in a horizontal direction.

At an air downstream side (vehicle rear side) of the evaporator 12, there is adjacently disposed a heater core 13 to form a predetermined distance therebetween. The heater core 13 is for re-heating cool air having passed through the evaporator 7. In the heater core 13, high-temperature cooling water (hot water) for cooling an engine of the vehicle flows, and the heater core 13 heats the air by using the cooling water as heat source. Similar to the evaporator 12, the heater core 13 is thin in the front-and-rear direction of the vehicle and is disposed in the air conditioning case 11 in such a manner that a longitudinal direction thereof extends in the up-and-down direction of the vehicle. However, the heater core 13 is inclined from a vertical direction to the front side of the vehicle with a slight angle.

In the air conditioning case 11, there is formed a cool air bypass passage 16 at an upper portion of the heater core 13, through which the air (cool air) flows while bypassing the heater core 13.

In the air conditioning case 11, between the heater core 13 and the evaporator 12, there is provided temperature control means in the form of a plate-like main air mixing door 17 and a plate-like auxiliary air mixing a door 18 for adjusting an amount ratio of warm air to be heated in the heater core 13 and the cool air bypassing the heater core 13 (i.e., cool are flowing in the bypass passage 16). Both air mixing doors 17 and 18 are integrally connected to rotary shafts 17a and 18a, respectively, and are rotatable with the rotary shafts 17a and 18a in the up-and-down direction of the vehicle.

The rotary shafts 17a and 18a are rotatably supported in the air conditioning case 11, and each end portion of the rotary shafts 17a and 18a protrudes outside and is connected to a link mechanism (not shown). Both air mixing doors 17 and 18 are interlockingly operated by the link mechanism and an actuator such as a servomotor in accordance with a blown-air temperature control signal of the air conditioning apparatus.

The rotary shaft 17a of the main air mixing door 17 is disposed at an upper side of the rotary shaft 18a of the auxiliary air mixing door 18 to form a predetermined distance therebetween, and both air mixing doors 17 and 18 are rotated to any rotational positions not to interfere with each other. In the maximum cooling operation, the air mixing doors 17 and 18 are rotated to positions where both are overlapped with each other, shown by a two-dot chain line in FIG. 2, in such a manner that both air mixing doors 17 and 18 are attached by pressure to a protrusion rib at a side of the air conditioning case 11 to fully close an air inflow passage into the heater core 13.

In the maximum heating operation, both air mixing doors 17 and 18 are rotated to positions shown by solid lines, and the main air mixing door 17 closes an inlet hole 16a of the cool air bypass passage 16. Simultaneously, a top end portion of the auxiliary air mixing door 18 is located at a position immediately after the evaporator 12 and in the vicinity of an extension line A of the partition plate 15 so that the auxiliary air mixing door 18 functions as partitioning means in the form of a movable partition member for partitioning an air passage between the evaporator 12 and the heater core 13 into the first air passage 8 and the second air passage.

Figure 15A:
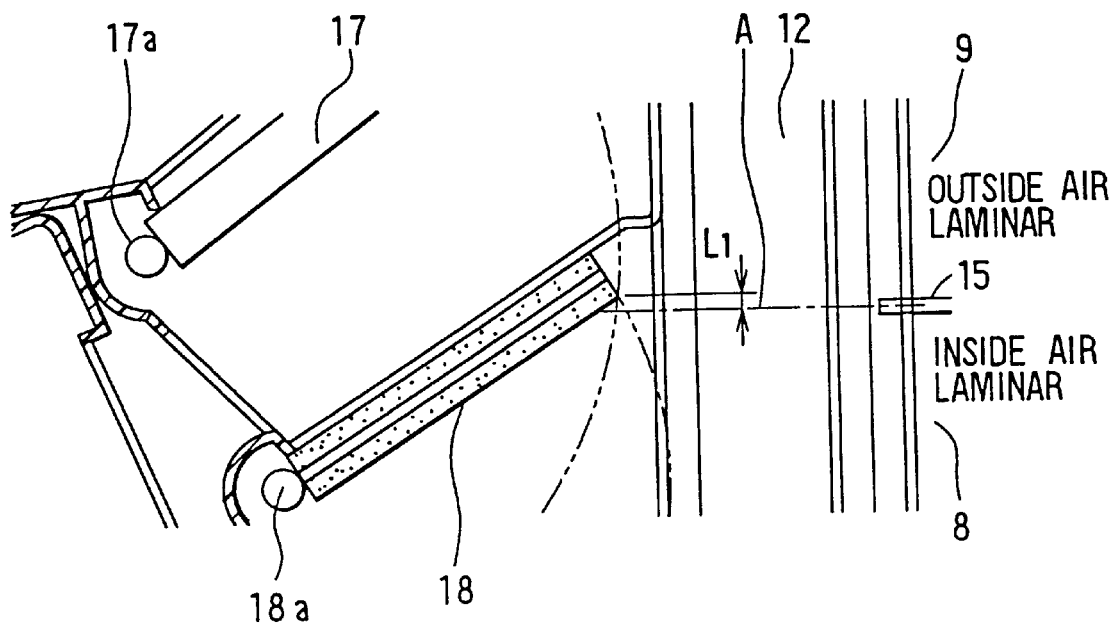
FIG. 15A is an enlarged view showing an auxiliary air mixing door according to the first embodiment.

Especially, in this embodiment, the top end portion of the auxiliary air mixing door 18 is shifted from the extension line A of the partition plate 15 toward the second air passage 9 by a predetermined distance. More specifically, as shown in FIG. 15A, the topmost end portion of the auxiliary air mixing door 18 is shifted from the extension line A of the partition plate 15 toward the second air passage 9 by a predetermined distance L1 (e.g., 2 mm). Therefore, the whole of the top end portion (the whole of the thickness of the top end portion including an elastic sealing material portion affixed on a door base plate) of the auxiliary air mixing door 18 can enter an area at a side of the second air passage 9.

Especially, in this embodiment, the top end portion of the auxiliary air mixing door 18 is set to be shifted from the extension line A of the partition plate 15 toward the second air passage 8 by a predetermined distance.

Here, rotating areas of both air mixing doors 17 and 18 are partially overlapped with each other, as shown by circular areas 17b and 18b of FIGS. 1 and 2. In this way, the rotating areas area are commonly used, and the space for installing both air mixing doors 17 and 18 can be reduced.

Further, in the layout where the rotating areas 17b and 18b of both air mixing doors 17 and 18 are partially overlapped with each other, to improve the function for partitioning the passage by the auxiliary air mixing door 18, the following construction is employed. That is, of the inner wall surface (wall surfaces of the air passages 8 and 9) of the air conditioning case 11, at a portion where the rotating areas 17b and 18b are overlapped, there is provided a level difference 11b which contacts only the auxiliary air mixing door 18 without contacting the main air mixing door 17.

Figure 16:
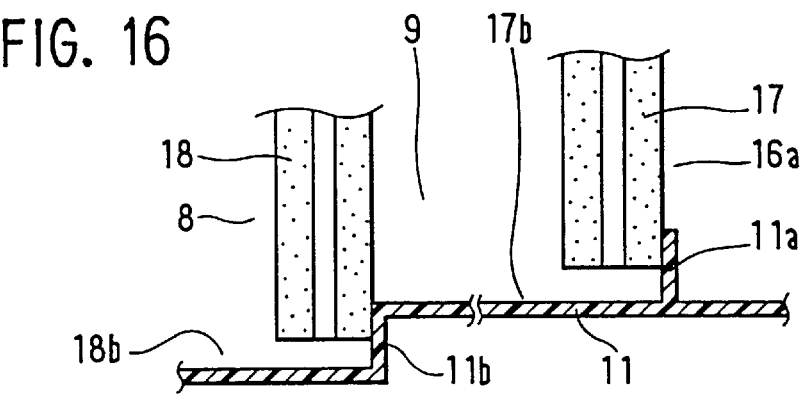
FIG. 16 is a cross sectional view taken along the line XVI—XVI of FIG. 2.

As shown in FIG. 16, the level difference 11b is integrally formed with the air conditioning case 11 made of resin. The level difference 11b is formed by enlarging the wall surface of the rotating area 18b of the auxiliary air mixing door 18 outwardly of the case, from the wall surface of the rotating area 17b of the main air mixing door 17.

Because the level difference 11b is formed on each wall surface of two case opposed to each other in a vertical direction of the sheet (the vehicle left-and-right direction), of the auxiliary air mixing door 18, both end portions in the direction of the rotary shaft 18a contact the level difference 11b.

Further, the level difference 11b is formed entirely from an end portion at the side of the rotary shaft 18a, of the auxiliary air mixing door 18, to an end portion at the opposite side of the rotary shaft 18a, so as to contact the auxiliary air mixing door 18.

The level difference 11b forms a sealing surface when the auxiliary air mixing door 18 is stopped to a position of the maximum heating operation.

In FIG. 16, a sealing surface 11a, to which the main air mixing door 17 in the maximum heating operation, is formed to protrude from the inner wall surface of the air conditioning case 11 at a peripheral portion of the inlet hole 16a of the cool air bypass passage 16. The sealing surface 11a secures a sealing effect when the main air mixing door 17 is stopped to a position of the maximum heating operation.

The evaporator 12 is of a laminated type in which a plurality of flat tubes, each of which is formed by connecting two metal thin plates made of aluminum or the like to each other, are laminated to sandwich a corrugated fin between the adjacent flat tubes, and then integrally brazed. In the evaporator 12, there is formed an air passage on the extension line A by a fin surface of the corrugated fin or a flat surface of the flat tube, so that the first air passage 8 and the second air passage are partitioned in the evaporator 12.

In the air conditioning case 11, there is provided, at an air downstream side (portion at the rear side of the vehicle), partitioning means in the form of a partition wall 19 integrally with the air conditioning case 11 and extending in the up-and-down direction to form a predetermined distance with the heater core 13. By the partition wall 19, there is formed a first warm air sage 19a extending upwardly from a position immediately after the heater core 13. At a downstream side (upper side) of the warm air passage joins to the cool air bypass passage 16 at an upper side of the heater core 13 to form a cool air/warm air mixing space 20 for mixing the cool air and the warm air.

Figure 13:
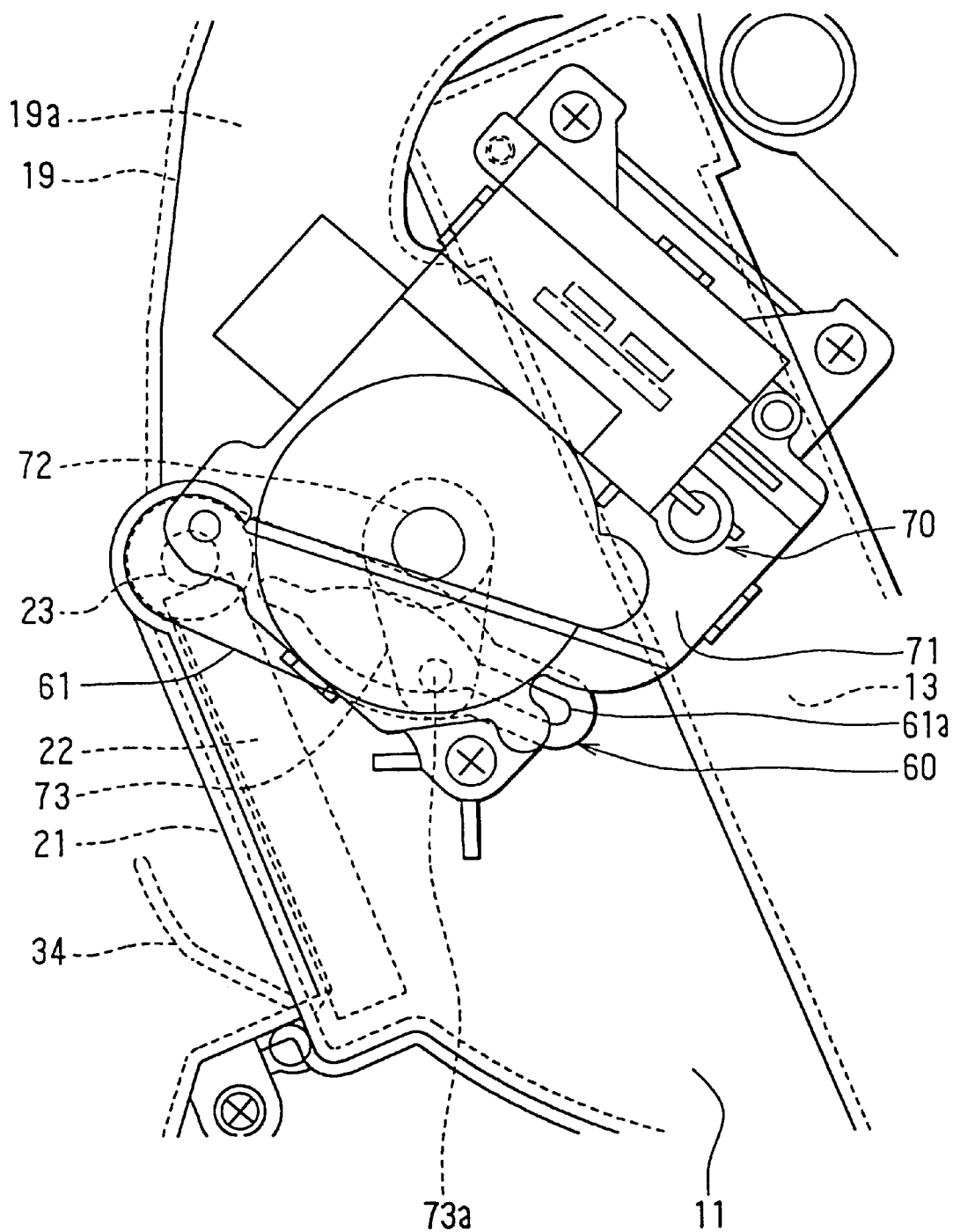
FIG. 13 is an enlarged view showing a main portion of a warm air bypass mixing door actuating mechanism in a state where a warm air bypass inlet portion is closed, according to the first embodiment.
Figure 14:
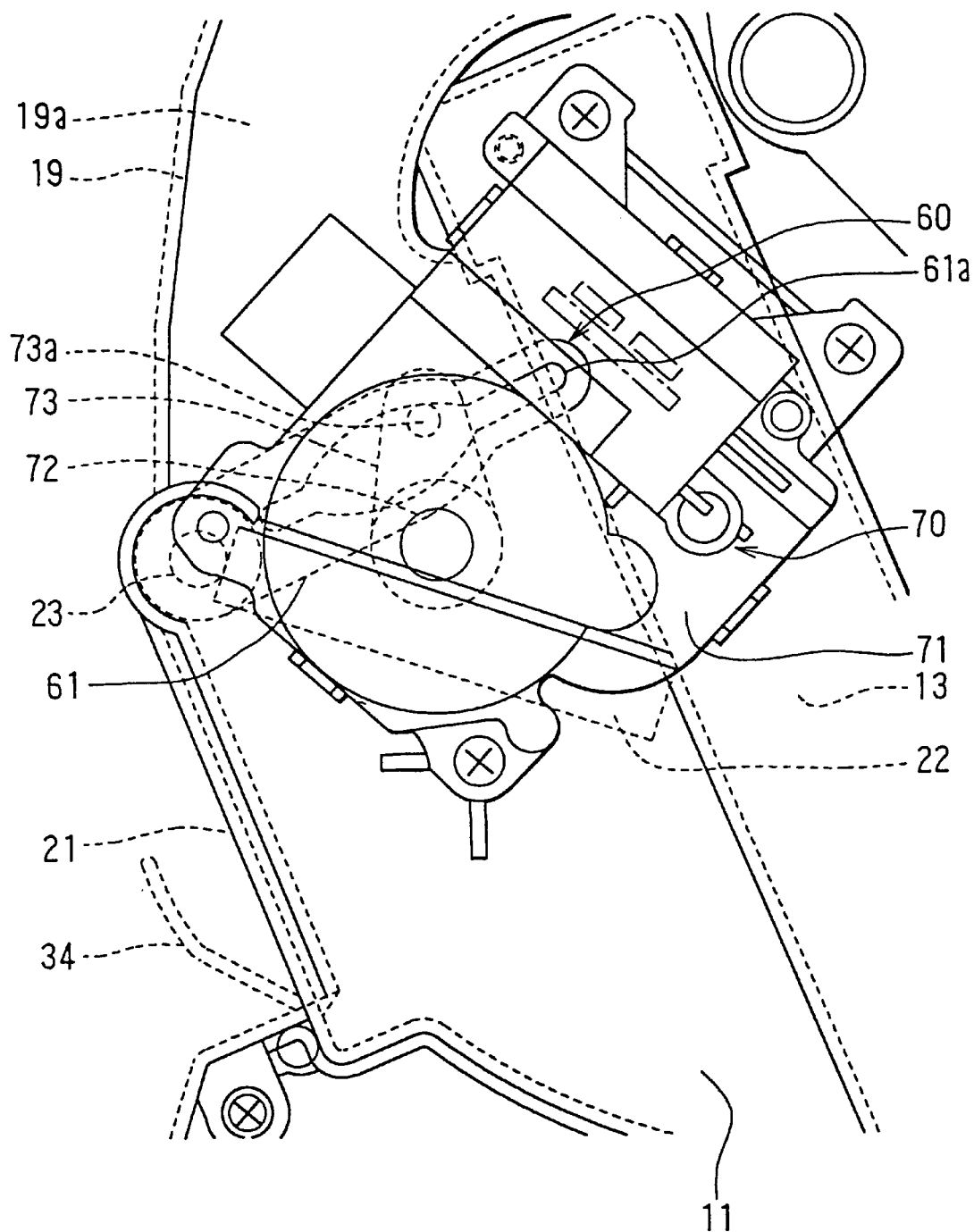
FIG. 14 is an enlarged view showing a main portion of the warm air bypass mixing door actuating mechanism in a double laminar mode, according to the first embodiment.

At a lower end portion of the partition wall 19, there is opened a warm air bypass inlet portion 21 opposed to a surface at the air downstream side, of the heater core 13 the warm air bypass inlet portion 21 is opened and closed by a warm air bypass door 22. The warm air bypass door 22 is connected to a rotary shaft 23 rotatably disposed at an upper end portion of the warm air bypass inlet portion 21, and is rotated integrally with the rotary shaft 23 between a position shown by the solid line and a position shown by the two-dot chain line in FIG. 2. In this embodiment, the warm air bypass door 22 is operated by a link mechanism and an actuator such as a servomotor, as shown in FIGS. 13 and 14, in accordance with a blown-air temperature control signal and an air outlet mode control signal of the air conditioning apparatus.

In a foot air outlet mode (described later) and a foot/defroster outlet mode (described later), when the maximum heating operation (double laminar mode) is set, the warm air bypass door 22 is operated to a position shown by the solid line of FIG. 2 (position in the vicinity of a partition line B of the heater core 13) so that the warm air bypass door 22 functions as partitioning means in the form of a movable partition member for partitioning the first warm air passage 19a immediately after the heater core 13 into the first air passage 8 and the second air passage 9. A stop position of the warm air bypass door 22 is set such that a top end portion of the door 22 is shifted from the partition line B toward the second air passage 9 by a predetermined distance, similar to the auxiliary air mixing door 18.

Figure 15B:
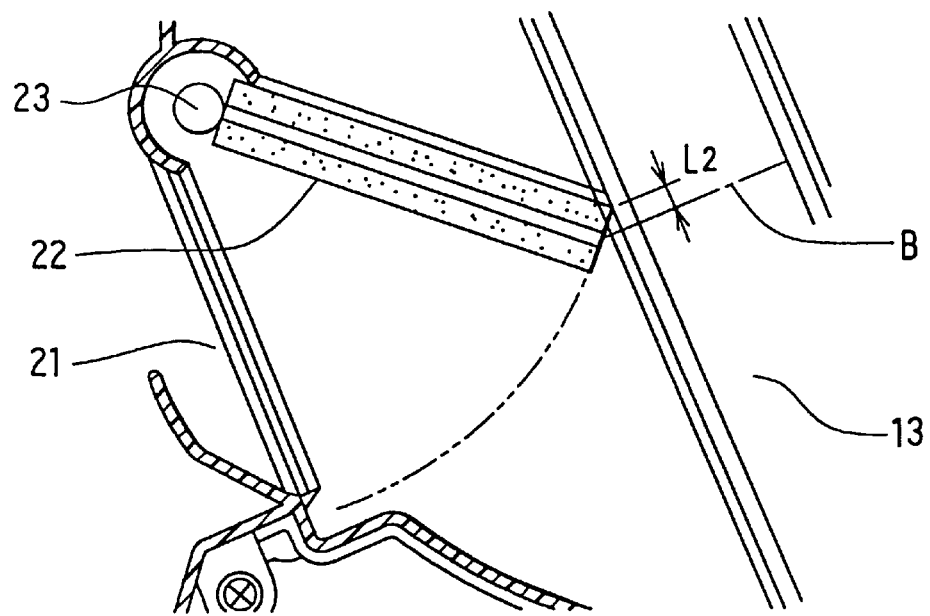
FIG. 15B is an enlarged view showing a warm air bypass door according to the first embodiment.

More specifically, as shown in FIG. 15B, the topmost end portion of the warm air bypass door 22 is shifted from the partition line B of the heater core 13 toward the second air passage 9 by a predetermined distance L2 (e.g., 3 mm).

The heater core 13 is of a type in which a plurality of flat tubes, each of which is formed by connecting metal thin plates made of aluminum or the like to have a flat cross section, to sandwich a corrugated fin between the adjacent flat tubes, and then integrally brazed. In the heater core 13, there is partitioned an air passage on the partition line B by a fin surface of the corrugated fin or a flat surface of the flat tube, so that the first air passage 8 and the second air passage are partitioned in the heater core 13.

At an air upstream side of the heater core 13, there is formed partitioning means in the form of a stationary partition plate 24 integrally with the air conditioning case 11, for partitioning between the partition line B and the rotary shaft 17a of the auxiliary air mixing door 18.

In an upper surface portion of the air conditioning case 11, there is opened a defroster opening portion 25 at a portion of the vehicle front side. The conditioned air from the cool air/the warm air mixing space 20, a temperature of which has been controlled, flows into the defroster opening portion 25, and then is blown out toward an inner surface of the windshield of the vehicle, through a defroster duct (not shown) and a defroster air outlet (not shown). An inlet hole 25a provided in a passage leading to the defroster opening portion 25 is opened and closed by the defroster door 26. The defroster door 26 is rotatably disposed by a rotary shaft 27.

In the upper surface portion of the air conditioning case 11, there is opened a face opening portion 28 at a portion of the vehicle rear side (at a side of the passenger). The conditioned air from the cool air/the warm air mixing space 20, a temperature of which has been controlled, flows into the face opening portion 25 through a communication path 36, and then is blown out from a face air outlet at an upper portion of the dashboard, through a face duct (not shown).

At an upper portion of a side surface at the vehicle rear side, of the air conditioning case 11, there is opened a front-seat foot opening portion 29. The conditioned air from the cool air/the warm air mixing space 20, a temperature of which has been controlled, flows into the front-seat foot opening portion 29 through a communication path 36, and in the maximum heating operation, the warm air from the warm air bypass inlet portion 21 through an opening thereof flows into the front-seat foot opening portion 29 through a second warm air passage 30. The warm air is blown out from the front-seat foot air outlet toward feet of the passenger at the front seat, through a front-seat foot duct (not shown).

Between an inlet hole 29a of the front-seat foot opening portion 29 and the face opening portion, there is disposed a foot/face switching door 31 rotatably supported by a rotary shaft 32. The inlet hole 29a of the front-seat foot opening portion 29 and the face opening portion 28 are selectively opened and closed by the door 31.

At a lower portion of a side surface at the vehicle rear side (at a side of the passenger), of the air conditioning case 11, there is opened a rear-seat foot opening portion 33 opposed to a position immediately after the warm air bypass inlet portion 21. The warm air from the warm air bypass inlet portion 21 and the second warm air passage 30 flows into the rear-seat foot opening portion 33, and is blown out from a rear-seat foot air outlet (not shown) toward feet of the passenger at the rear seat, through a rear-seat foot duct (not shown).

Further, at a lower end portion of the warm air bypass inlet portion 21, there is provided a warm air guide plate for guiding the warm air toward the second warm air passage 30.

In this embodiment, in the double laminar mode during the foot air outlet mode, at an air downstream side of the heater core 13, the warm air bypass door 22 is operated to a position shown by the solid line to partition the first and the second air passages 8 and 9 and to open the communication path 36. In this way, the first and the second air passages 8 and 9 are communicated with each other at a position in the vicinity of the front-seat foot opening portion 29.

The defroster door 26 and the foot/face switching door 31 are connected to a link mechanism (not shown) and are interlockingly operated by an actuator such as a servomotor in accordance with an air outlet mode control signal of the air conditioning apparatus.

Each of the above-described doors 4, 5, 17, 18, 22, 26, and 31 has the same structure in a state of the single unit, and has a door base plate made of resin or metal, which is integrally connected to the respective rotary shafts 4a, 5a, 17a, 18a, 23, 27, and 32 and is covered with elastic sealing materials at both sides.

In this embodiment, the warm air bypass door 22 and the foot/face switching door 31 construct foot-side door means.

Next, an operation of the first embodiment having the above-described construction will be described.

The air conditioning apparatus is provided with an electronic control unit (not shown) to which an operation signal from each of various operation members and a sensor signal from each of various air conditioning sensors are input, and each position of the doors 4, 5, 17, 18, 22, 26, and 31 is controlled by output signals of the control unit.

Figure 3:
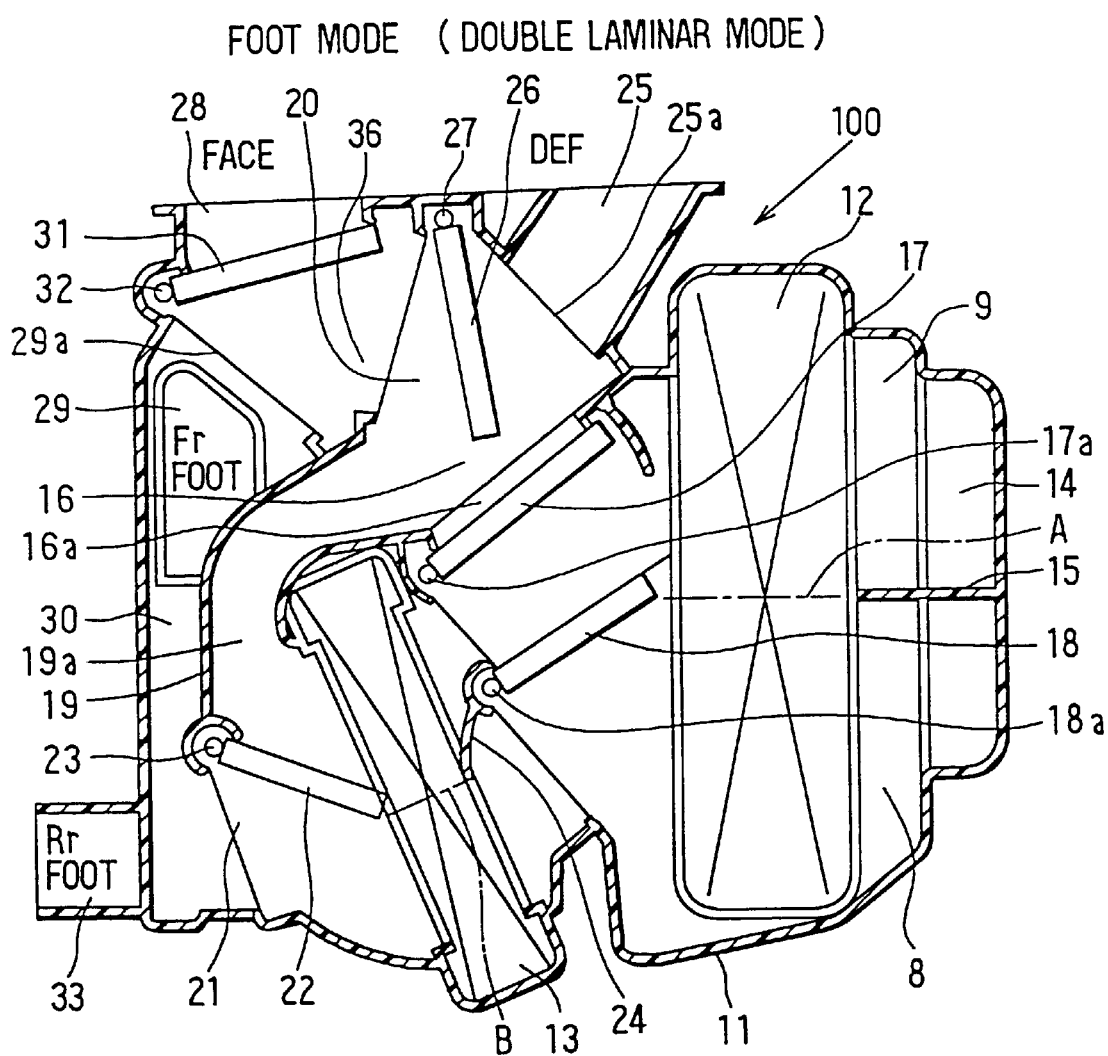
FIG. 3 is a cross sectional view showing a state of a double laminar mode in a foot air outlet mode according to the first embodiment.

FIGS. 1 to 3 show a state in which the double laminar mode is set when the maximum heating state is set in the foot air outlet mode. In this state, the first inside air introduction port 2 is communicated with the suction port 6a of the first (inside air) fan 6 and further the outside air introduction port 3 is communicated with the suction port 7a of the second (outside air) fan 7 in the blower unit 1. Therefore, in this state, the first fan 6 blows the inside air from the inside air introduction port 2 into the first (inside air) passage 8, and the second fan 7 blows the outside air from the outside air introduction port 3 into the second (outside air) passage 9.

Further, in the air conditioning unit 100, both air mixing doors 17 and 18 are rotated to the positions shown by the solid lines, so that the main air mixing door 17 fully closes the inlet port 16a of the cool air bypass passage 16, and simultaneously the top end portion of the auxiliary air mixing door 18 is located at a position immediately after the evaporator 12 and is shifted from the extension line A of the partition plate 15 toward the second air passage 9 by the predetermined distance. In this way, the auxiliary air mixing door 18 functions as the movable partition member for partitioning the air passage between the evaporator 12 and the heater core 13 into the first air passage 8 and the second air passage 9.

The warm air bypass door 22 is operated to the position shown by the solid line, so that the warm air bypass door 22 functions as the movable partition member for partitioning the first warm air passage 19a immediately after the first warm air passage 19a into the first air passage 8 and the second air passage 9 and opens the warm air bypass inlet portion 21.

The defroster door 26 is operated to an intermediate position between the communication path 36 and the inlet hole 25a of the defroster opening portion 25 to open both of the communication path 36 and the defroster opening portion 25. The foot/face switching door 31 closes the face opening portion 28 and opens the front-seat foot opening portion 29.

Therefore, by operating fans 6 and 7, the inside air from the inside air introduction port 2 and the outside air from the outside air introduction port 3 flow separately into the first air passage 8 and the second air passage 9, respectively, while being partitioned by the partition members 10, 15, 18, and 22. All of the inside air and the outside air passes through the heater core 13 and are heated maximally.

After being heated in the heater core 13, the inside air passes through the warm air bypass inlet portion 23 and the second warm air passage 30 and leads to the front-seat and the rear-seat opening portions 29 and 33. On the other hand, after being heated in the heater core 13, the outside air passes through the first warm air passage 19a at an upper side of the warm air bypass door 22, leads to the cool air/warm air mixing space 20, and further is divided into two flows therefrom. One of the outside air flows into the defroster opening portion 25, and the other outside air flows into the front-seat foot opening portion 29 through the communication path 36.

As a result, the warm air produced by heating the outside air having a low-humidity flows into the defroster opening portion 25, and the warm air having a low-humidity is blown out toward the inner surface of the windshield, so that the defrosting performance of the windshield can be secured sufficiently. Further, the high-temperature warm air produced by heating the inside air mainly is blown out into the front-seat and the rear-seat foot opening portions 29 and 33, so that the heating effect can be improved. In FIG. 2, an arrow C shows a flow of the inside air, whereas an arrow D shows a flow of the outside air.

At this time, a ratio of an amount of air blown into the defroster opening portion 25 and an amount of air blown into the foot opening portions 29 and 33 is controlled by operating the defroster door 26 into the intermediate position of the defroster door 26 to introduce the outside air in the second air passage 9 into the front-seat opening portion 29, so that the amount of the air blown into the foot opening portions 29 and 33 is set approximately 80% and the amount of the air blown into the defroster opening portions 25 is set approximately 20%.

Further, a noticeable point in the double laminar mode is that, although there is formed the communication path 36 communicating the first air passage 8 and the second air passage 9 at a downstream side of the heater core 13, the inside air is effectively prevented from flowing into the defroster opening portion 25.

That is, as described above, the ratio of the amount of the outside air is larger than that of the inside air (more specifically, there is set the ratio of approximately 4.5:5.5), further, the outside air is guided by the defroster door 26 to direct a dynamic pressure of the outside air having reached the position of the cool air/warm air mixing space 20 toward the communication path 36, and the air flow resistance in the front-seat and the rear-seat opening portions 29 and 33 is sufficiently smaller than that in the defroster opening portion 25. Therefore, the dynamic pressure of the inside air having reached the portion of the front-seat foot opening portion 29 is released into the front-seat foot opening portion 29 and lowers, and it is prevented that the inside air flows backward in the communication path 36 and is mixed into the outside air in the defroster opening portion 25.

In addition, because the auxiliary air mixing door 18 contacts the level difference 11b when the auxiliary air mixing door 18 is stopped at the position of the maximum heating operation to construct the sealing surface, the function for partitioning the first air passage 8 and the second air passage 9 can be improved. Therefore, the separating performance between the outside air and the inside air can be further improved.

In this way, it is possible to suppress the inside air from flowing into the area of the outside air laminar through the gap at the top end portion of the warm air bypass door 22.

Further, in the double laminar mode, the top end portion of the auxiliary air mixing door 18 is shifted from the extension line A of the partition plate 15 toward an area of the second air passage 9 (the outside air laminar area) by the predetermined distance L1, and the top end portion of the warm air bypass door 22 is shifted from the partition line B inside the heater core 13 toward an area of the second air passage 9 (the outside air laminar area) by the predetermined distance L2.

A dynamic pressure of the outside air in the second air passage 9 is applied to gaps at the top end portions of the auxiliary air mixing door 18 and the warm bypass door 22, and the outside air may flow into the gap. However, according to the above construction, it is possible to satisfactorily suppress the inside air in the first air passage 8 from leaking into the outside air laminar area through the gap.

Figure 4:
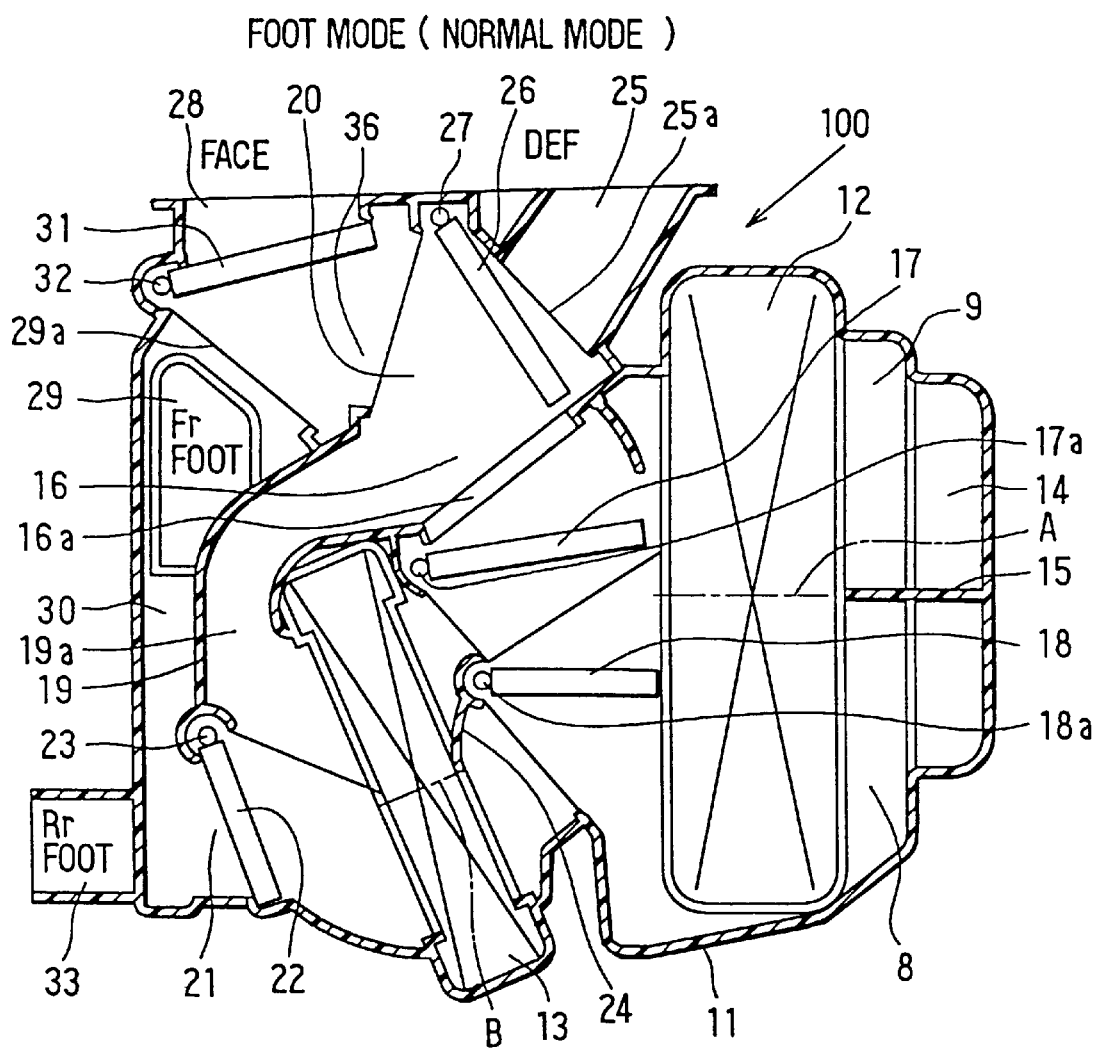
FIG. 4 is a cross sectional view showing a state of a normal mode in the foot air outlet mode according to the first embodiment.

Next, in the foot air outlet mode, when both mixing doors 17 and 18 are operated from the maximum heating state to an intermediate opening position to control a temperature of the blown-air, the air conditioning unit 100 becomes in a state of a normal mode as shown in FIG. 4. In this state of the normal mode, both air mixing doors 17 and 18 are operated to the intermediate opening position, and the main air mixing door 17 opens the cool air bypass passage 16. Therefore, the cool air passes through the cool air bypass passage 16 and flows directly into the cool air/warm air mixing space 20 while bypassing the heater core 13.

Interlocked with the operations of both air mixing doors 17 and 18, the warm air bypass door 22 is operated to the position shown by the solid line in FIG. 4, in which the warm air bypass inlet portion 21 is closed and the partitioning function for the first warm air passage 19a immediately after the heater core 13 is eliminated.

Therefore, all of the warm air heated while passing through the heater core 13 rises in the first warm air passage 19a and then is mixed with cool air from the cool air bypass passage 16 in the space 20, so that warm air having a desired temperature can be obtained. Most of the warm air passes through the communication path 36, leads toward the front-seat and the rear-seat foot opening portions 29 and 33, and is blown out toward feet of the passenger.

The remaining warm air in the space 20 leads toward the defroster opening portion 25 and is blown out toward the inner surface of the windshield.

In the foot air outlet mode having a temperature control area shown in FIG. 4, the maximum heating capacity is not necessary. Therefore, in the inside air/outside air introduction mode, generally, there is set a whole outside air mode in which both of the first and the second inside air introduction ports 2 and 2a are closed and only the outside air introduction port 3 is opened. However, temperature control means is provided by a manual operation of the passenger, there may be set a whole inside air mode in which the outside air introduction port 3 is closed and both of the first and the second inside air introduction ports 2 and 2a are opened, or an inside air/outside air mixture mode in which the inside air and the outside air are simultaneously introduced, as described above.

In the foot air outlet mode having this temperature control area, because the amount of the air blown toward the front-seat and the rear-seat foot opening portions 29 and 33 may lower by closing the warm air bypass inlet portion 21, the defroster door 26 is displaced from the position in FIG. 3 to the position in FIG. 4, in which an opening area of the communication path 36 is increased to prevent a decrease of the amount of the blown-air.

Figure 5:
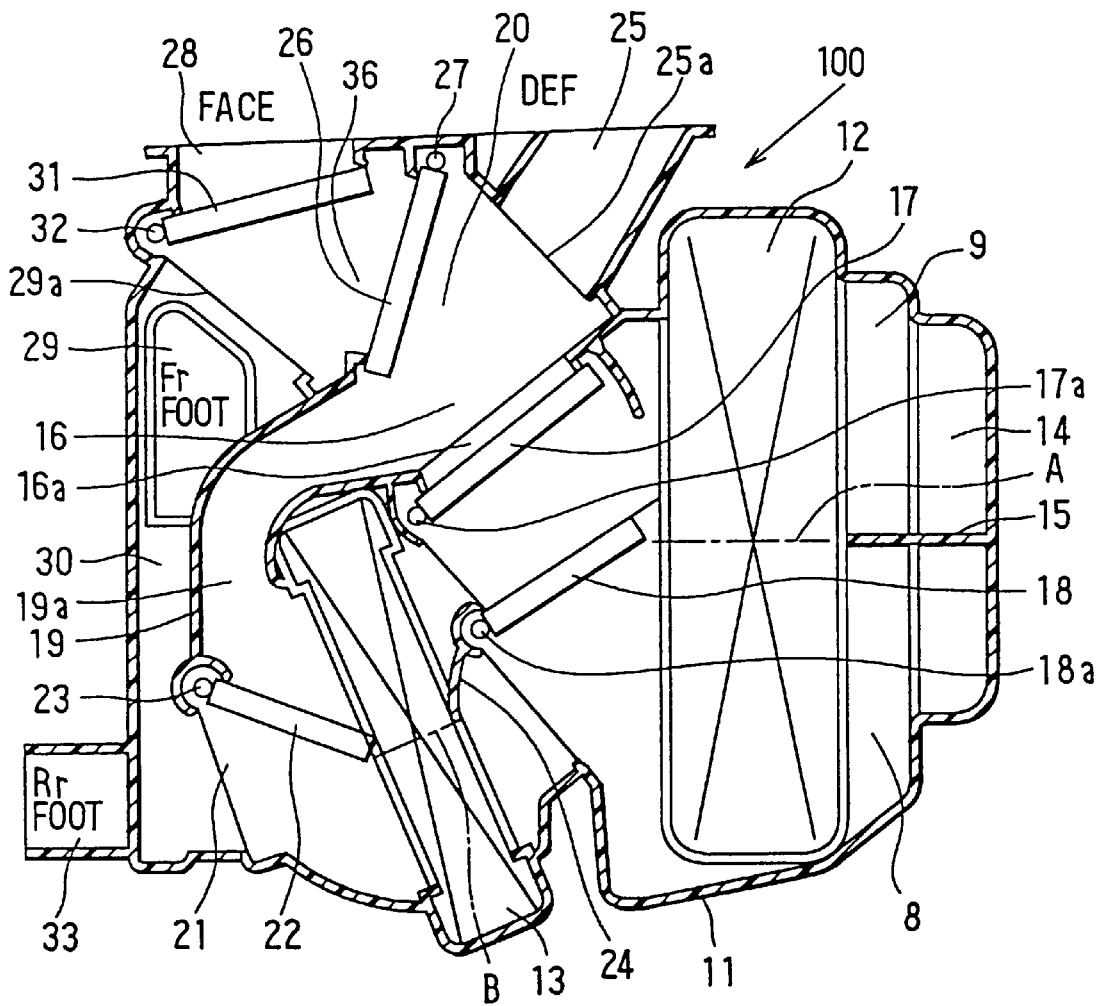
FIG. 5 is a cross sectional view showing a state of a double laminar mode in a foot/defroster air outlet mode according to the first embodiment.

Next, FIG. 5 shows a state in which the double laminar mode is set when the maximum heating state is set in the foot/defroster air outlet mode in which an amount of air blown from the front-seat and the rear-seat foot opening portions 29 and 33 is approximately equal to that from the defroster opening portion 25. In the double laminar mode during the foot/defroster air outlet mode, as being understood from a comparison with FIG. 3, the defroster door 26 is operated to a position to close the communication path 36.

In this way, because there is no flow of air flowing from the communication path 36 toward the front-seat foot opening portion 29, it is possible to set the amount of the air blown from the front-seat and the rear-seat opening portions 29 and 33 to be approximately equal to that from the defroster opening portion 25. The other points are similar to those in the double laminar mode in the foot air outlet mode.

Because air flow resistance of each portion in the air conditioning unit 100 varies for every product, the defroster door 26 may be operated to a position where the communication path 36 is opened slightly. In this way, in the double laminar mode, not only in the foot air outlet mode but also the foot defroster air outlet mode, the outside air from the second air passage 9 flows into the front-seat foot opening portion 29 through the communication passage 9.

Figure 6:
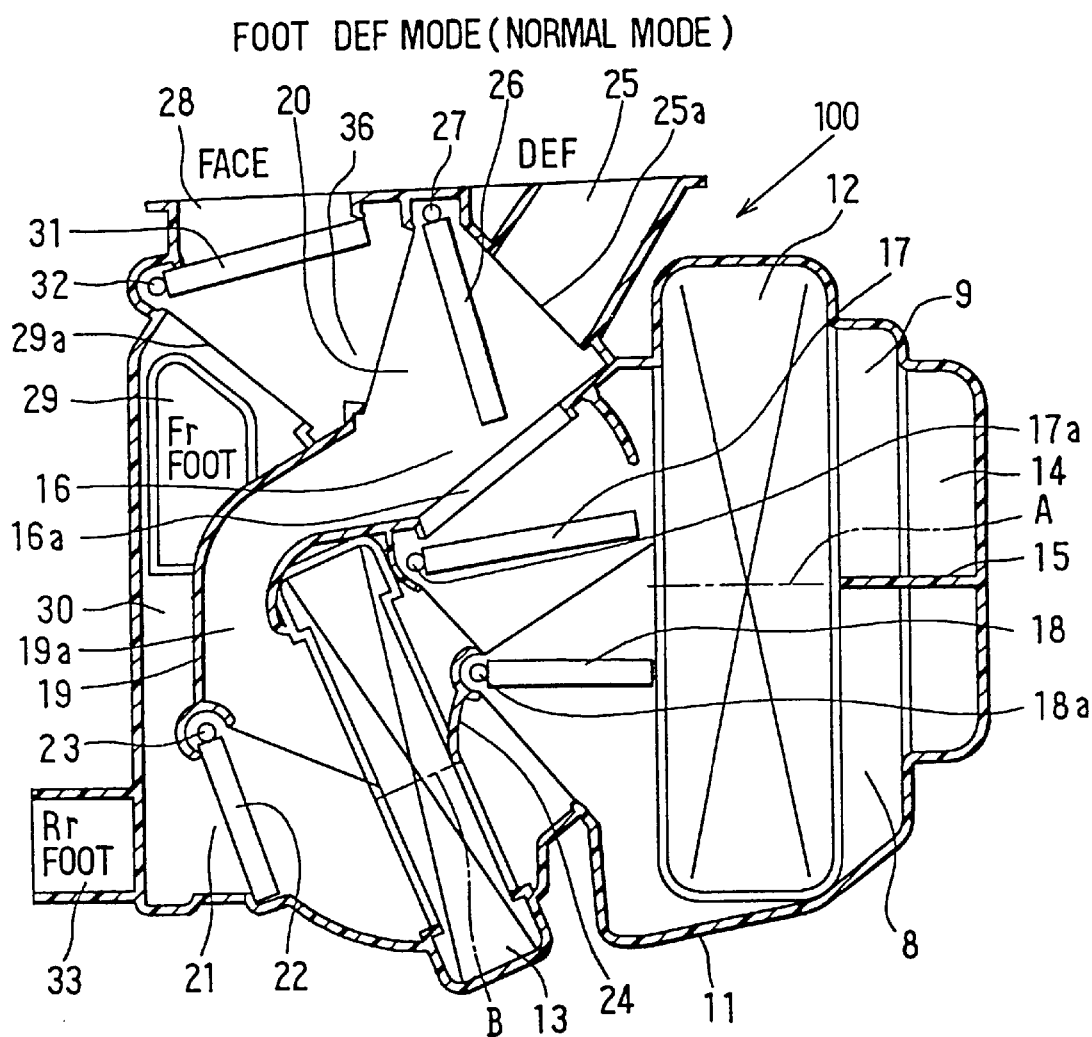
FIG. 6 is a cross sectional view showing a state of a normal mode in the foot/defroster air outlet mode according to the first embodiment.

Next, FIG. 6 shows a state of a normal mode when both mixing doors 17 and 18 are operated from the maximum heating state to an intermediate opening position in the foot/defroster air outlet mode, to control a temperature of the blown-air. In this state of the normal mode, interlocked with the operations of both air mixing doors 17 and 18, the warm air bypass door 22 is operated to the position shown by solid line in FIG. 6, to close the warm air bypass inlet portion 21. To secure an air flow passage toward the front-seat and the rear-seat foot opening portions 29 and 33, the defroster door 26 is operated to an intermediate position shown in FIG. 6 to maintain an air amount ratio in which an amount of the air blown toward the foot opening portions 29 and 33 is approximately equal to that toward the defroster opening portion 25.

Figure 7:
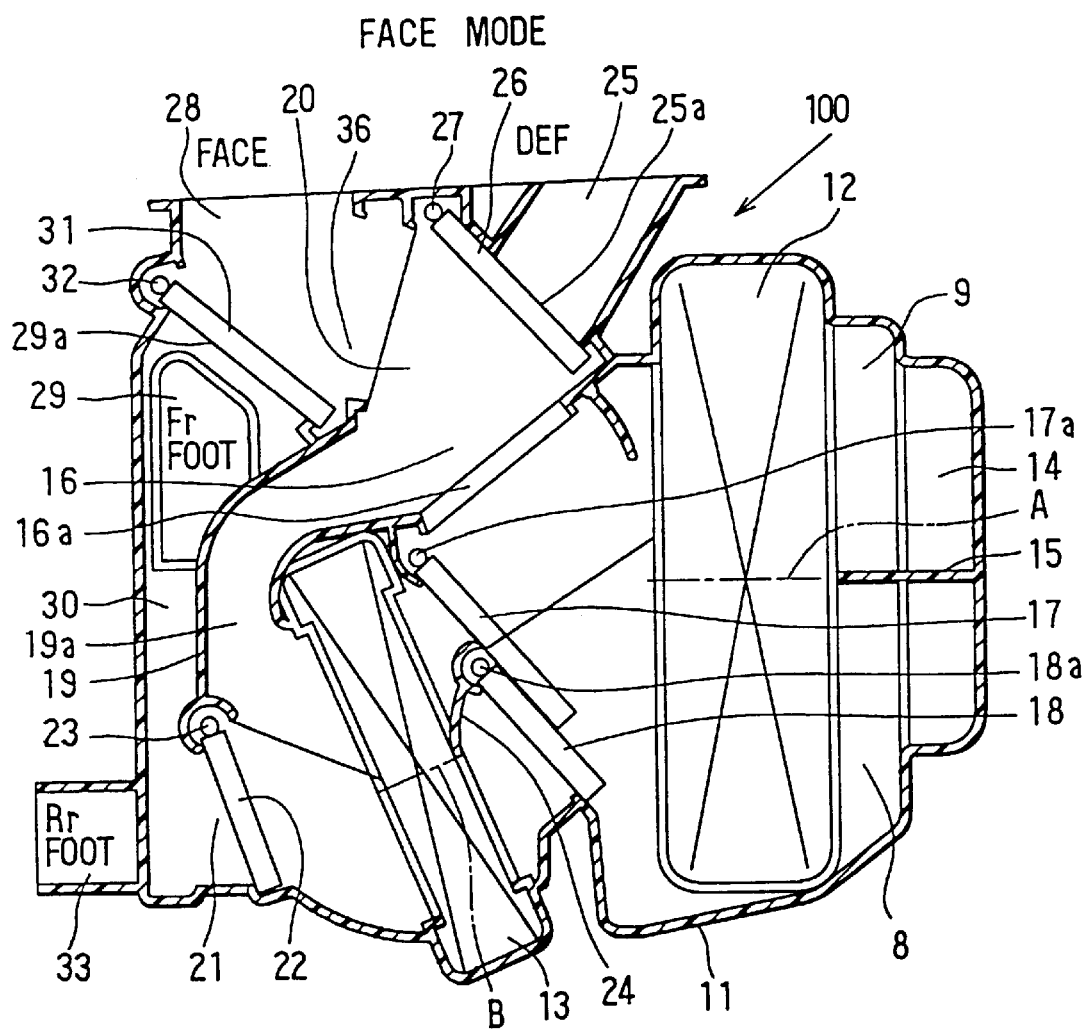
FIG. 7 is a cross sectional view showing a state of a face air outlet mode according to the first embodiment.

FIG. 7 shows a state of a face air outlet mode, in which the doors 22, 26 and 31 is operated to positions shown by the solid lines, respectively, to open only an air passage into the face opening portion 28. Both air mixing doors 17 and 18 are operated in the maximum cooling state to fully close an air inflow passage into the heater core 13. Therefore, all of cool air cooled in the evaporator 12 passes through the bypass passage 16 and is blown out toward the face opening portion 28.

By operating both air mixing doors 17 and 18 from the maximum cooling state toward the maximum heating operation, a temperature of the blown-air in the face air outlet mode can be adjusted freely.

Figure 8:
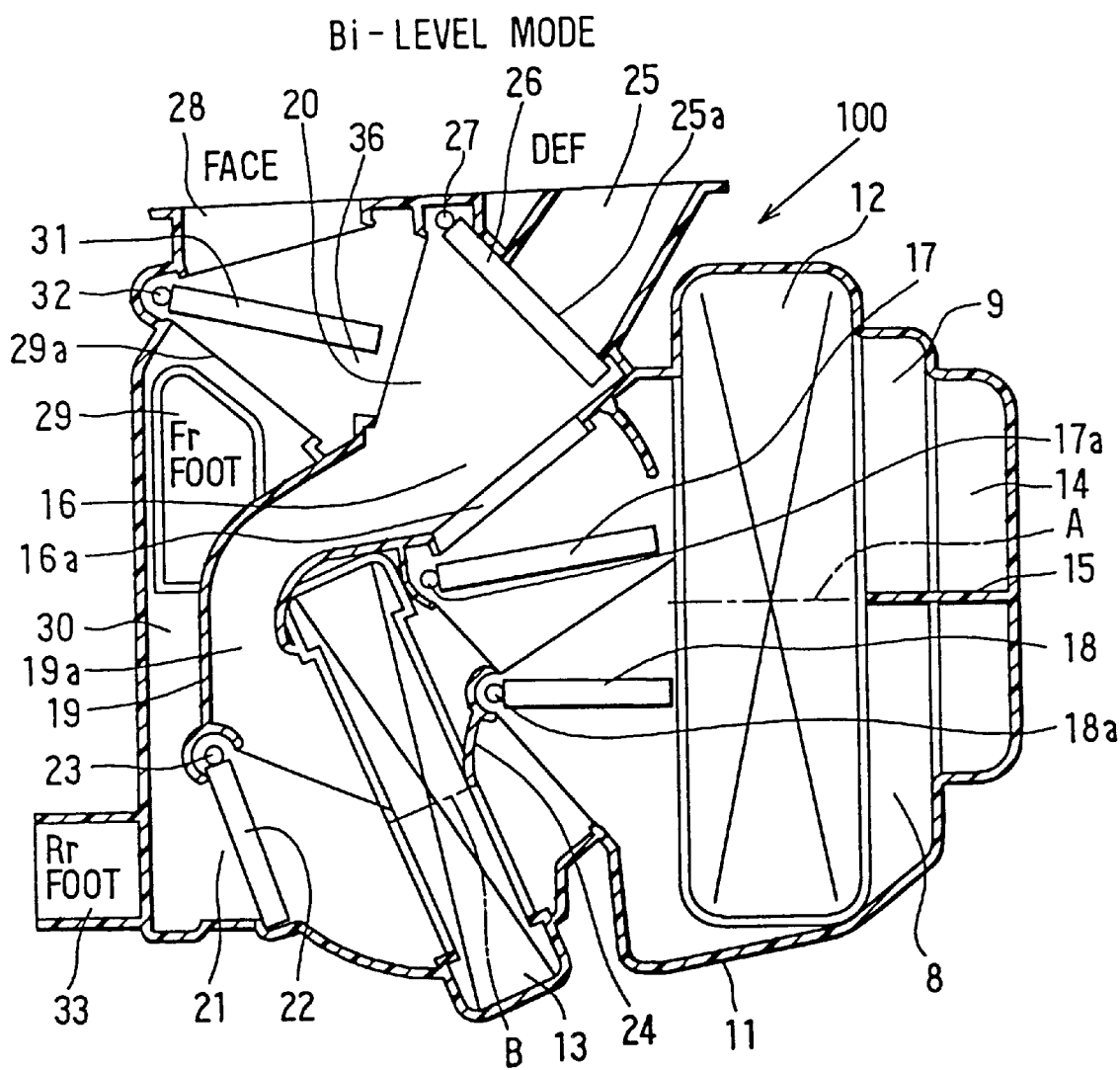
FIG. 8 is a cross sectional view showing a state of a bi-level air outlet mode according to the first embodiment.

FIG. 8 shows a state of a bi-level air outlet mode, in which the foot/face switching door 32 is operated from the position of the face air outlet mode to an intermediate position where an air passage toward the face opening portion 28 and an air passage toward the foot opening portions 29 and 33 are opened simultaneously. In this way, the cool air from the cool air bypass passage 16 is mainly blown toward the face opening portion 28, and the warm air from the first warm air passage 19a is mainly blown into the foot opening portions 29 and 33. Therefore, the temperature of the air blown toward the face opening portion 28 is lower than that toward the foot opening portions 29 and 33, so that a temperature distribution of the blown-air, for cooling a head portion and heating a foot portion can be obtained.

Figure 9:
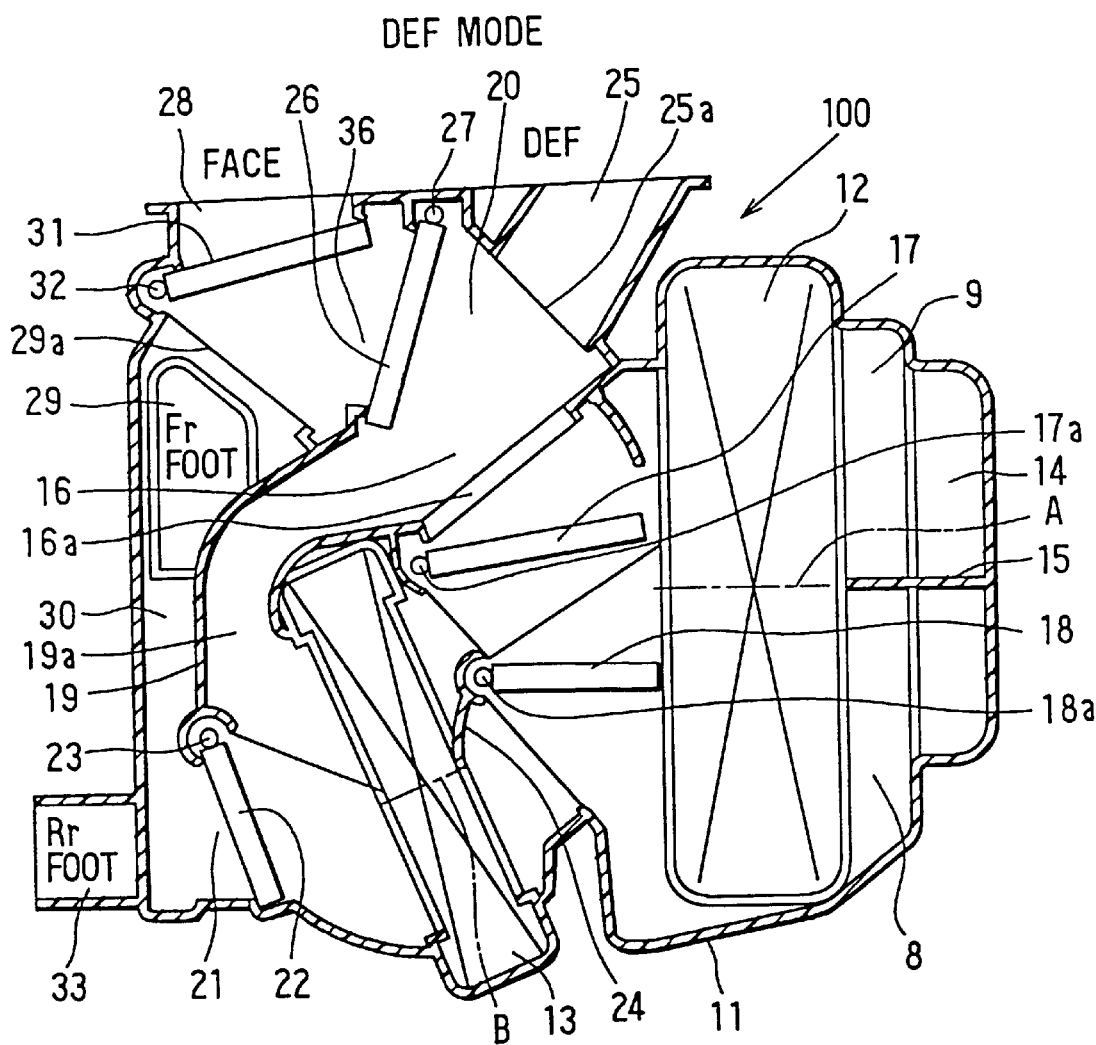
FIG. 9 is a cross sectional view showing a state of a defroster air outlet mode according to the first embodiment.

FIG. 9 shows a state of a defroster air outlet mode, in which the doors 22, 26 and 31 is operated to positions shown by the solid lines, respectively, to open only an air passage into the defroster opening portion 25. Both air mixing doors 17 and 18 are operated in the maximum heating state to fully close the cool air bypass passage 16; however, by rotating both air mixing doors 17 and 18 from the maximum heating state toward the maximum cooling operation, a temperature of the blown-air in the defroster air outlet mode can be adjusted freely. Further, in the defroster air outlet mode, the warm air bypass door 22 is operated to a position where the warm air bypass inlet portion 21 is closed, so that the warm air is prevented from flowing toward the second warm air passage 30.

Figure 10:
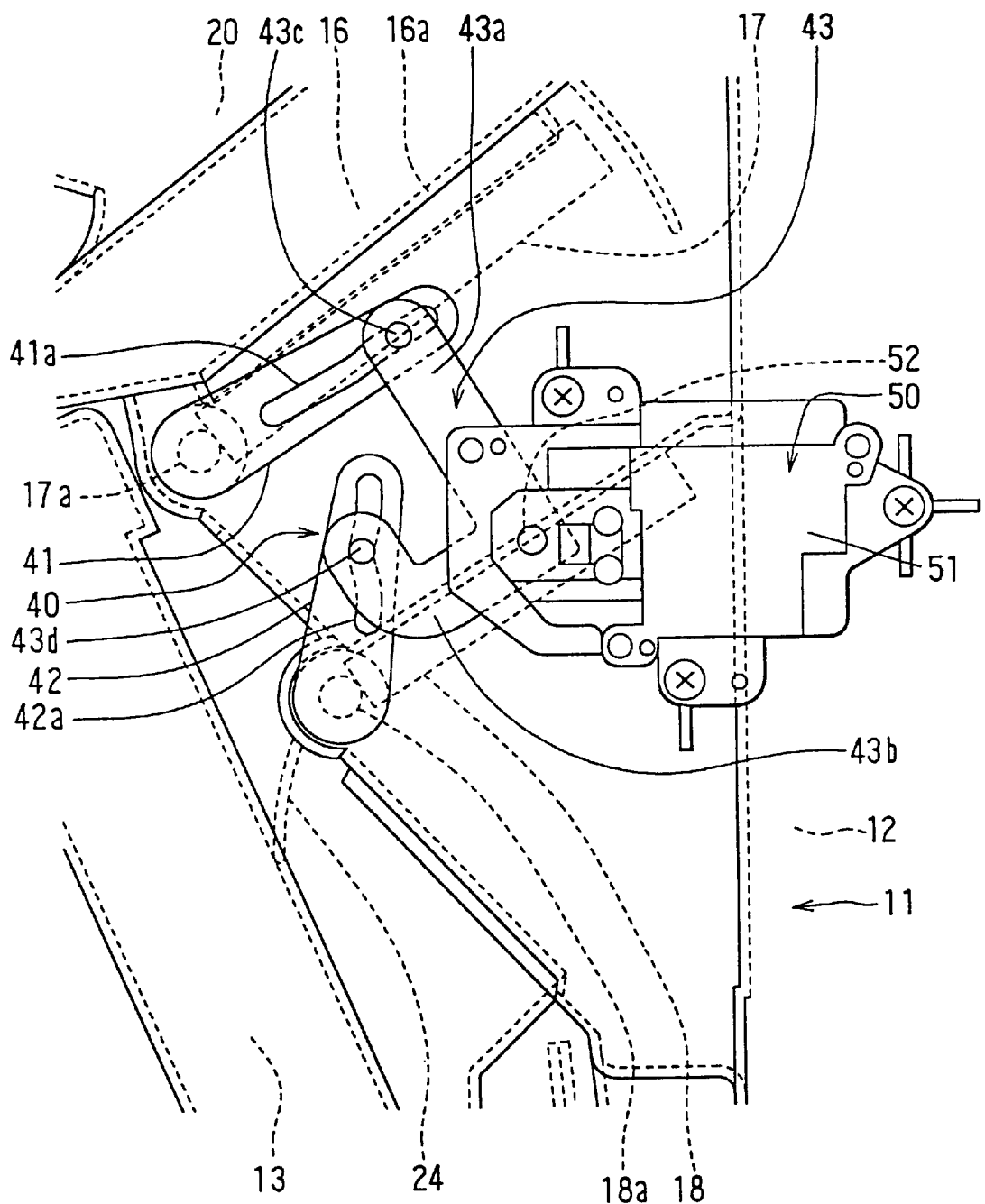
FIG. 10 is an enlarged view showing a main portion of an air mixing door actuating mechanism in the maximum heating state according to the first embodiment.
Figure 11:
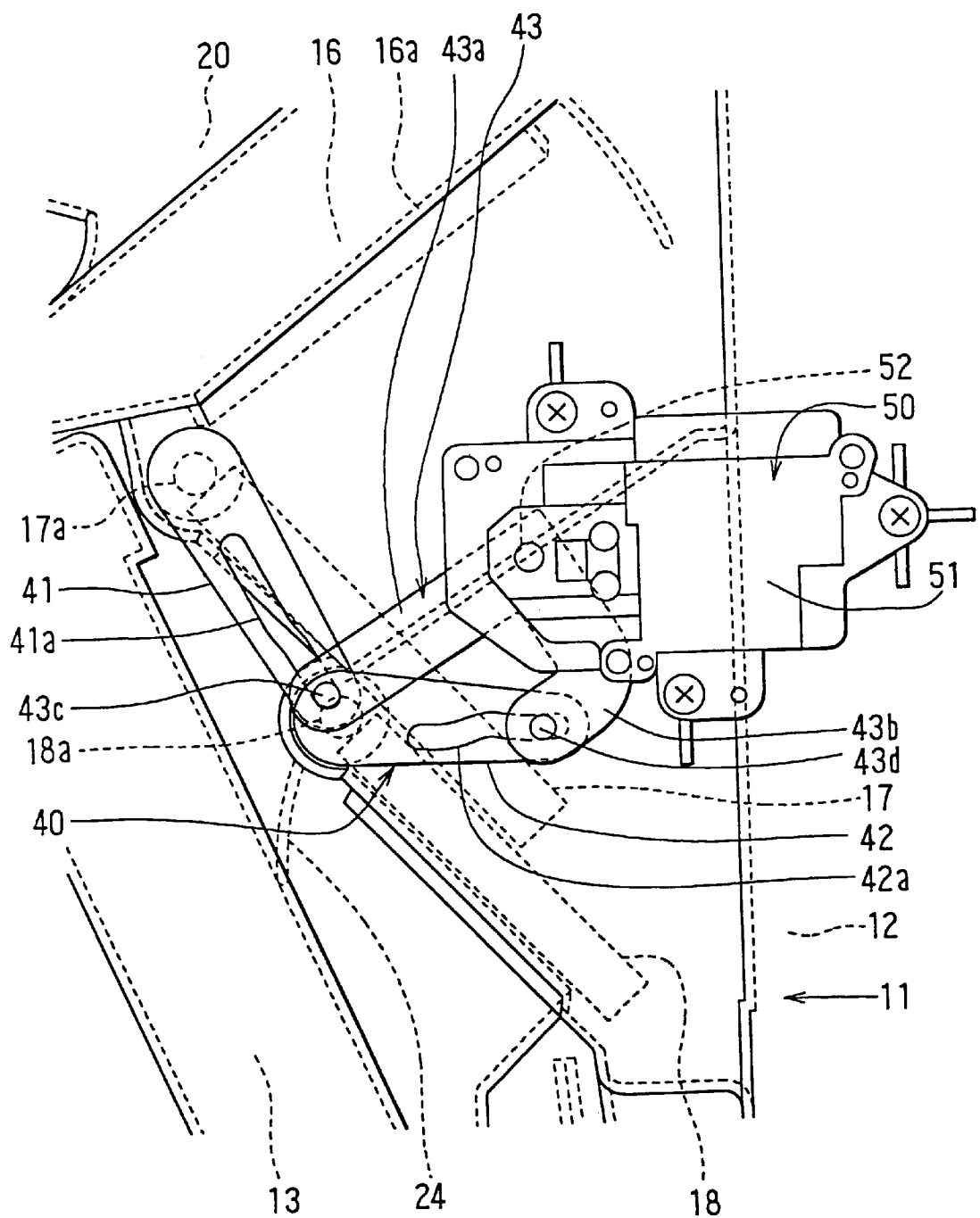
FIG. 11 is an enlarged view showing a main portion of an air mixing door actuating mechanism in the maximum cooling state according to the first embodiment.

Next, FIGS. 10 and 11 specifically show a link mechanism 40 for interlockingly operating two plates of the air mixing doors 17 and 18 and a servomotor (actuator) 50 for actuating the doors. Each of the rotary shaft 17a and 18a of the air mixing doors 17 and 18 protrudes outside the air conditioning case 11, and the protruding end portions are integrally connected to one end portions of driven link levers 41 and 42, respectively. In the driven link levers 41 and 42, there are formed cam grooves 41a and 42a, respectively.

On the other hand, the servomotor 50 is fixed onto a portion at a vehicle front side from the rotary shafts 17a and 18a, of the outer wall surface of the air conditioning case 11, by fastening means such as a screw. In a motor case 51 of the servomotor 50, there are accommodated a motor mechanism portion (not shown) and an output shaft 52. The axial direction of the output shaft 52 extends in a vertical direction of the sheet (the vehicle left-and-right direction) of FIGS. 10 and 11.

A rotation center portion of an actuating link lever 43 integrally formed in a forked shape is integrally connected to the output shaft 52 so that the output shaft 52 and the actuating link lever 43 rotate integrally. Pin portions 43c and 43d are integrally provided on top ends of a first lever portion 43a and a second lever portion 43b of the actuating link lever 43, respectively. The pin portions 43c and 43d are slidably fitted in the cam grooves 41a and 42a of the driven link levers 41 and 42, respectively.

FIG. 10 shows rotational positions of the air mixing doors 17 and 18 in the maximum heating state (including the double laminar mode), and FIG. 11 shows rotational positions of the air mixing doors 17 and 18 in the maximum cooling state.

Since the link mechanism 40 and the servomotor 50 for actuating the doors are constructed as described above, when the output shaft 52 of the servomotor 50 rotates, the rotary shafts 17a and 18a of both air mixing doors 17 and 18 rotate through the actuating link lever 43 and the driven link levers 41 and 42, respectively, and both air mixing doors 17 and 18 interlockingly rotate.

Figure 12:
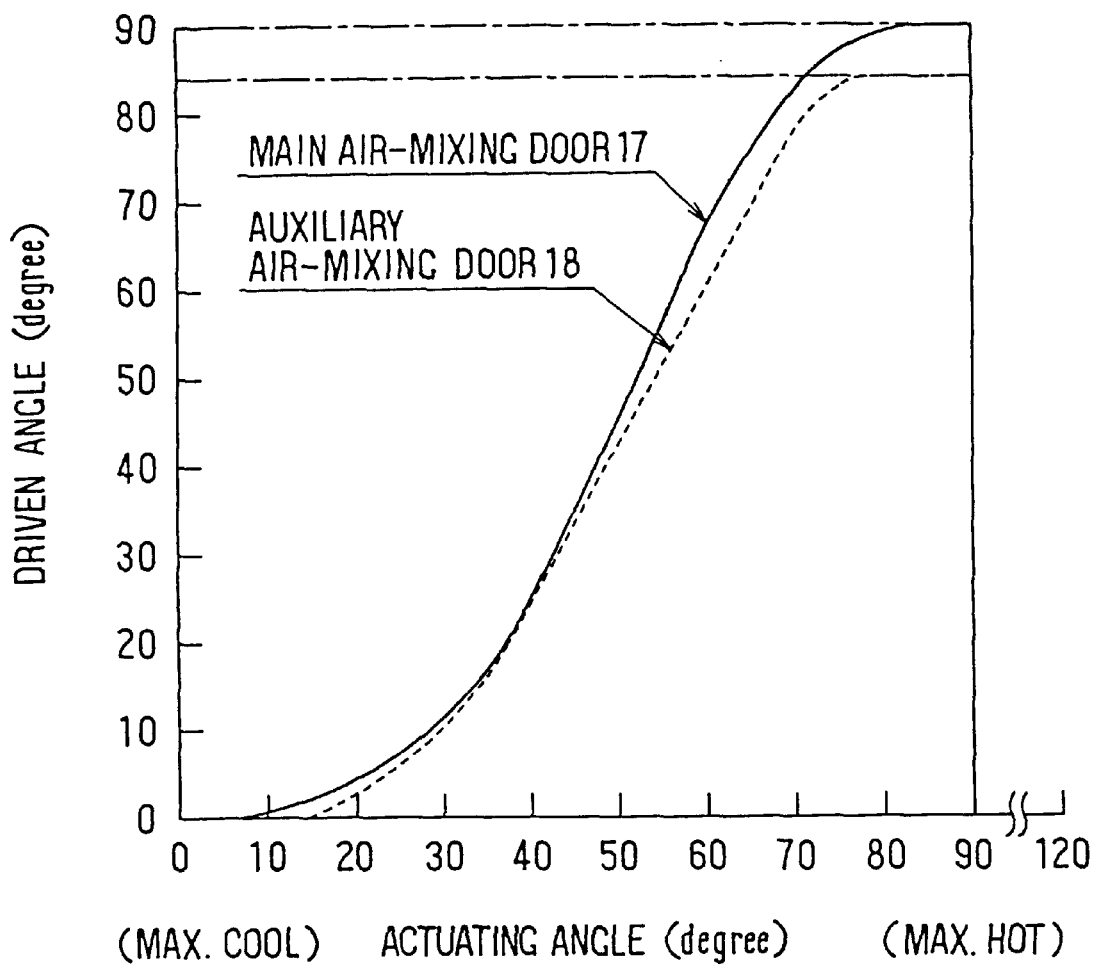
FIG. 12 shows characteristics of an operation of the air mixing door mechanism according to the first embodiment.

FIG. 12 shows characteristics of door operation, in which the horizontal axis indicates a rotational angle, i.e., an actuating angle, of the servomotor 50 and the vertical axis indicates rotational angles, i.e., driven angles, of the air mixing doors 17 and 18. According to the characteristics of door operation of FIG. 12, first, the main air mixing door 17 rotates from the maximum cooling position (the actuating angle is equal to 0°), and slightly thereafter the auxiliary air mixing door 18 starts to rotate. At a side of the maximum heating operation, first, the auxiliary air mixing door 18 finishes rotating, and thereafter the main air mixing door 17 finishes rotating.

According to the characteristics of door operation of FIG. 12, in the maximum heating operation, the auxiliary air mixing door 18 is rotated to the predetermined partition position (the position where the auxiliary air mixing door 18 is shifted from the partition line A of the evaporator 12 toward the outside air by the predetermined distance), as shown in FIG. 15A.

FIGS. 13 and 14 specifically show a link mechanism 60 for rotating the warm air bypass door 22 and a servomotor (actuator) for actuating the door. The rotary shaft 23 of the warm air bypass door 22 protrudes outside the air conditioning case 11, and the protruding end portion is integrally connected to one end portion of a driven link lever 61. In the driven link lever 61, there is formed cam groove 61a.

On the other hand, the servomotor 70 is fixed onto a portion at a vehicle front side from the rotary shaft 23, of the outer wall surface of the air conditioning case 11, by fastening means such as a screw. In a motor case 71 of the servomotor 50, there are accommodated a motor mechanism portion (not shown) and an output shaft 72. The axial direction of the output shaft 72 extends in a vertical direction of the sheet (the vehicle left-and-right direction) of FIGS. 13 and 14.

A rotation center portion of an actuating link lever 73 is integrally connected to the output shaft 72 so that the output shaft 72 and the actuating link lever 73 rotate integrally. A pin portion 73a is integrally provided on a top end of the actuating link lever 73. The pin portions 73a is slidably fitted in the cam groove 61a of the driven link lever 61.

FIG. 13 shows a state where the warm air bypass door 22 closes the warm air bypass inlet portion 21, and FIG. 14 shows a state where the warm air bypass door 22 partitions the first warm air passage 19a at a position immediately after the heater core 13 into the first air passage 8 and the second air passage 9.

Since the link mechanism 60 and the servomotor 70 for actuating the door are constructed as described above, when the output shaft 72 of the servomotor 70 rotates, the rotary shaft 23 of the warm air bypass door 22 rotates through the actuating link lever 73 and the driven link lever 61, and the warm air bypass door 23 rotates between the position shown in FIG. 13 and the position shown in FIG. 14.

In the first embodiment, the warm air bypass door 22 is actuated by the actuating mechanism provided independently of the actuating mechanism (link mechanism and the actuating servomotor) of the air mixing doors 17 and 18; however, the warm air bypass door 22 may be actuated commonly by the actuating mechanism of the air mixing doors 17 and 18.

For example, the rotary shaft 23 of the warm air bypass door 22 is connected to an output shaft of the actuating servomotor of the air mixing doors 17 and 18 through a link mechanism. Further, in the other air outlet modes than the foot air outlet mode and the foot/defroster air outlet mode, e.g., in the defroster mode, even if both air mixing doors 17 and 18 are rotated to the maximum heating state, the warm air bypass door 22 is maintained at the closing position (shown by the two-dot chain line in FIG. 2) where the warm air bypass inlet portion 21 is closed, and only in the maximum heating operation in the foot air outlet mode and the foot/defroster air outlet mode, the warm air bypass door 22 is switched from the closing position to a partitioning position for partitioning between the first air passage 8 and the second air passage 9.

For this operation, in the maximum heating operation in the foot air outlet mode and in the foot/defroster air outlet mode, a rotational amount of the actuating servomotor of the air mixing door is increased as compared with the maximum heating operation in the other air outlet modes, and by the increase of the rotational amount of the servomotor, the warm air bypass door 22 may be switched from the closing position to the partitioning position between the first air passage 8 and the second air passage 9, while both air mixing doors 17 and 18 are maintained at the maximum heating state.

The present invention may be employed in an air conditioning apparatus in which the rear-seat opening portion 33 is eliminated from the first embodiment.

Further, in the first embodiment, the single warm air bypass door 22 has not only a function as the movable partition member in the double laminar mode but also a function for opening and closing the warm bypass inlet portion 21; however, according to a modification of the second warm air passage 30 in the air conditioning unit, the warm air bypass door 22 may be divided into a door having a function as the movable partition member and a door for opening and closing the warm bypass inlet portion 21.

A second embodiment of the present invention will be described with reference to FIGS. 17 to 24.

The inventors of the present invention have specifically examined and studied the switching order of the inside air/outside air switching doors 4 and 5 in the blower unit 1 and the warm air bypass door 22 in the air conditioning unit 100 in the first embodiment. As a result, it turns out that, by selectively operating the inside air/outside air switching doors 4 and 5 and the warm air bypass door 22 based on the predetermined switching order, the windshield can be effectively prevented from being frosted or clouded in a switching process between the whole outside air mode and the inside air/outside air double laminar mode. In the second embodiment, the switching order is defined.

Figure 17:
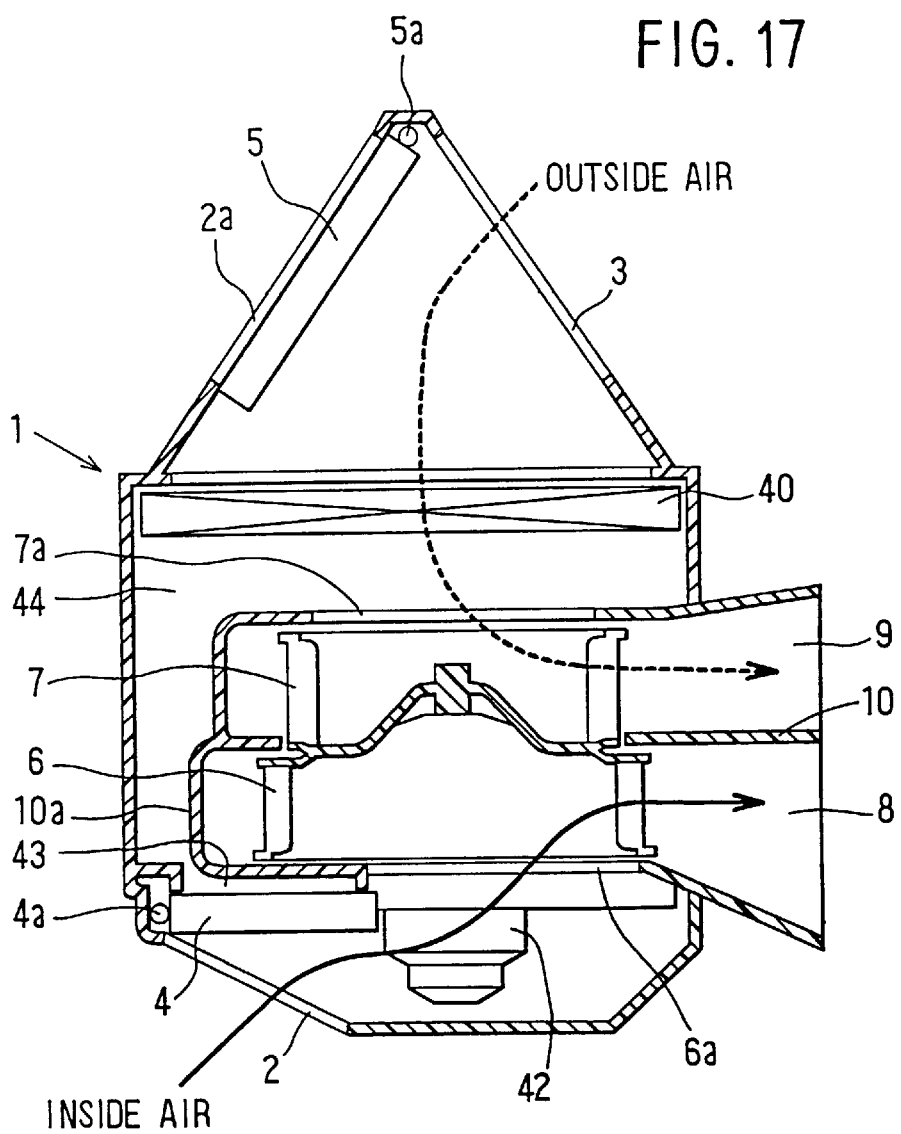
FIG. 17 is a cross sectional view showing a blower unit according to a second embodiment of the present invention.
Figure 18:
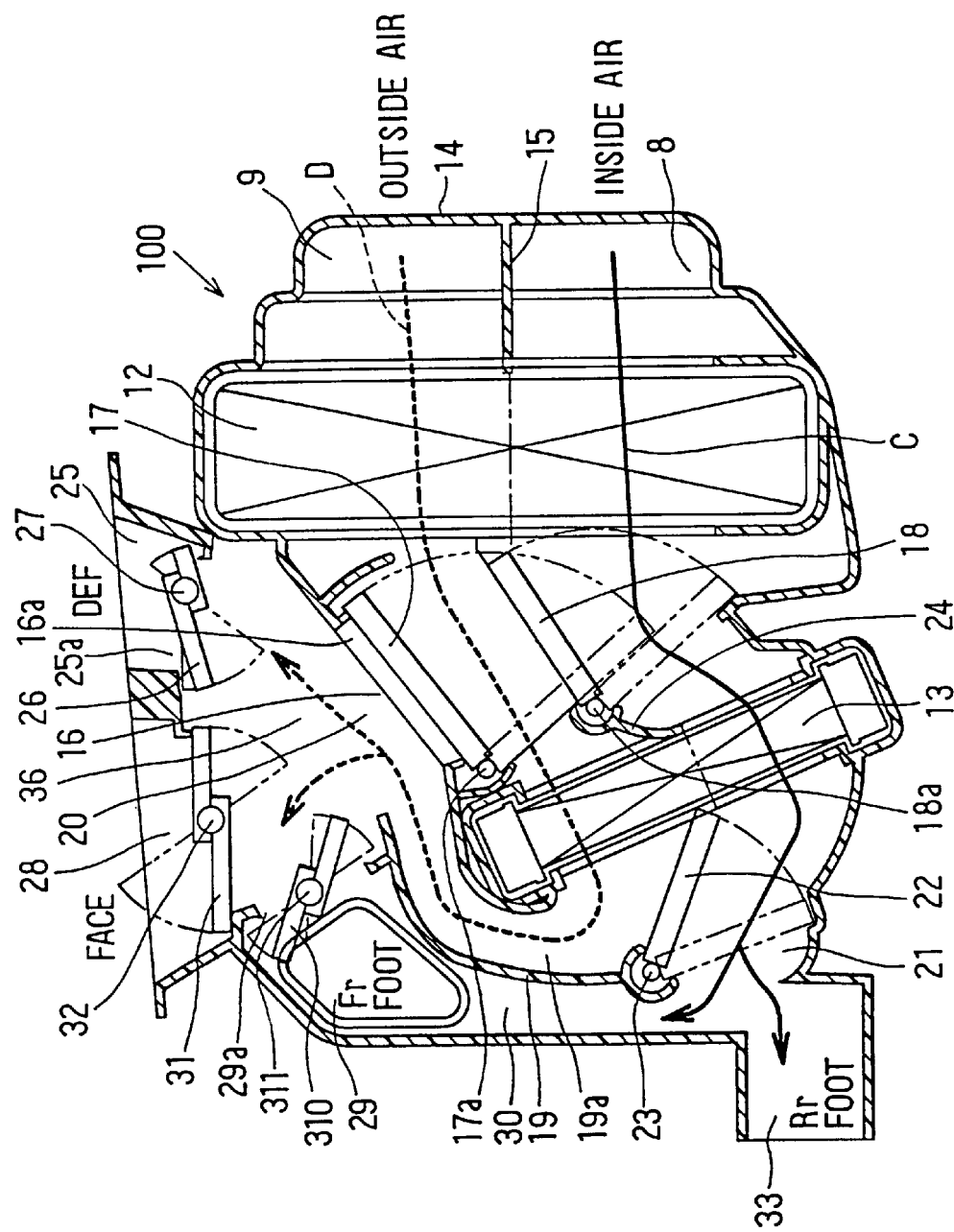
FIG. 18 is a cross sectional view showing an air conditioning unit according to the second embodiment.

FIGS. 17 and 18 show the blower unit 1 and the air conditioning unit 100, respectively. The constructions of the blower unit 1 and the air conditioning unit 100 are basically identical or equivalent to those in the first embodiment, and shown by the same reference numerals.

In the blower unit 1 shown in FIG. 17, the outside air introduction port 3 and the second inside air introduction port 2a are adjacently disposed in an upper portion of the unit, and the outside air introduction port 3 and the second inside air introduction port 2a are selectively opened and closed by the second inside air/outside air switching door 5. At a downstream side of the second inside air/outside air switching door 5, there is disposed an air filter for purifying (removing dusts in or adsorbing an malodor of) an air introduced from the outside air introduction port 3 and the second inside air introduction port 2a.

Further, at a lower side of the first fan 6 at the side of the inside air, there is disposed an actuating electric motor 42. By the actuating electric motor 42, the first fan 6 at the side of the inside air and the second fan 7 at the side of the outside air are rotated. The suction port 6a of the first fan 6 can be in communication with the first inside air introduction port 2 and also with a space 44 at a downstream side of the air filter through a communication path 43. The first inside air/outside air switching door 4 selectively opens and closes the first inside air introduction port 2 and the communication path 43.

In the air conditioning unit 100 shown in FIG. 18, a door mechanism for switching the air outlet mode is modified from the first embodiment. That is, the defroster door 26 is a butterfly-shaped door which rotates with the rotary shaft 27 as a center thereof to open and close the inlet hole 25a of the defroster opening 25. In this embodiment, the defroster door 26 does not contribute to open and close the communication path 36.

The foot/face switching door 31 of the first embodiment is divided into a face door 31 and a foot door 310. The face door 31 and the foot door 310 are butterfly-shaped doors which rotate, respectively, with the rotary shafts 32 and 311 as a center thereof to open and close the face opening portion 28 and the inlet hole 29a of the front-seat foot opening portion 29.

The defroster door 26, the face door 31, and the foot door 310, which are door means for switching the air outlet mode, are connected to a link mechanism (not shown) and are interlockingly operated by an actuator such as a servomotor in accordance with an air outlet mode control signal of the air conditioning apparatus. The other points than the above-described features are same as in the first embodiment.

Figure 20B:
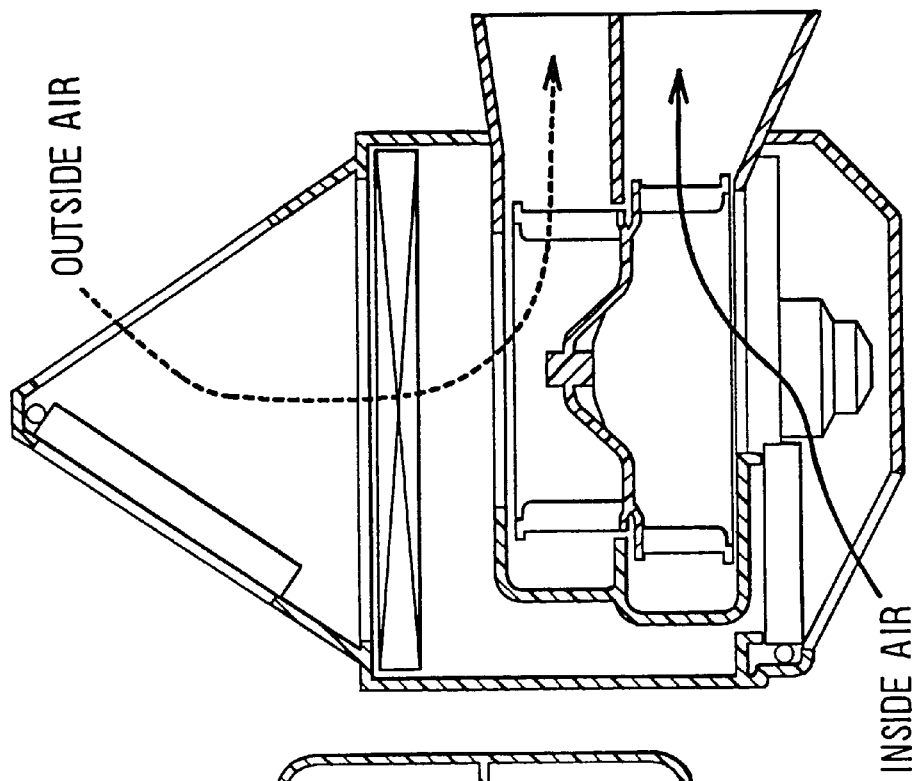
FIG. 20B is a cross sectional view of the blower unit in a double laminar mode according to the second embodiment.
Figure 20A:
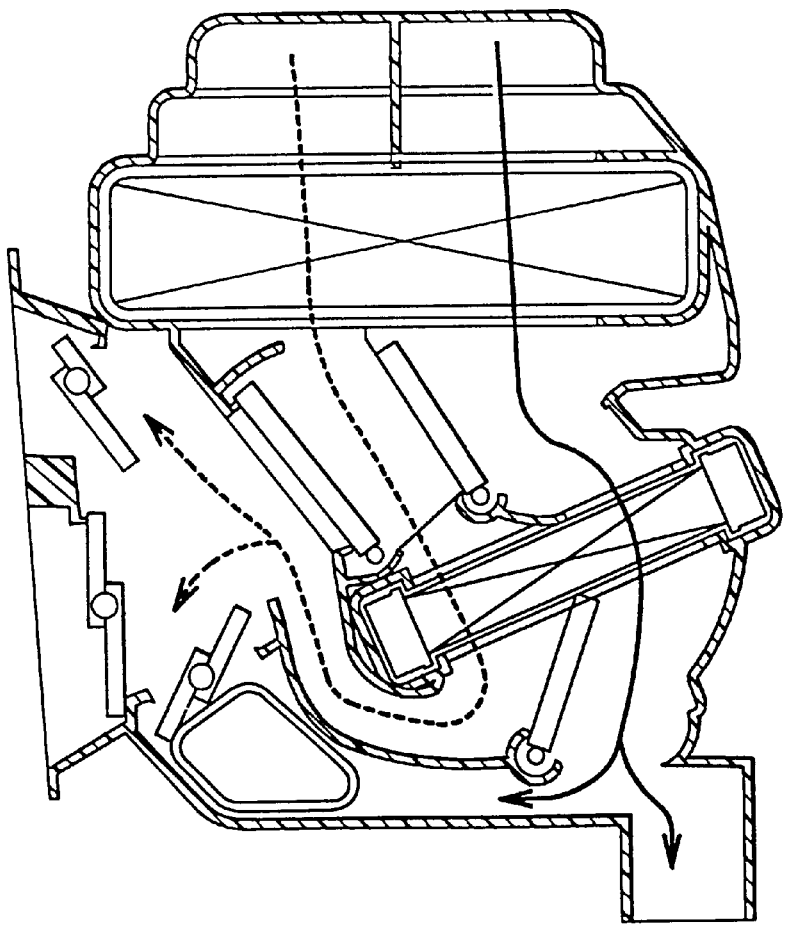
FIG. 20A is a cross sectional view of the air conditioning unit in a double laminar mode according to the second embodiment.

FIG. 19 shows a state of the whole outside air mode in the foot/defroster air outlet mode, and FIG. 20 shows a state of the double laminar mode in the foot/defroster air outlet mode. Also in the foot air outlet mode, it is only different therefrom that the opening degree of the defroster door 26 decreases and the opening degree of the foot door 10 increases, and the other points are same as in the foot/defroster air outlet mode.

Figure 21B:
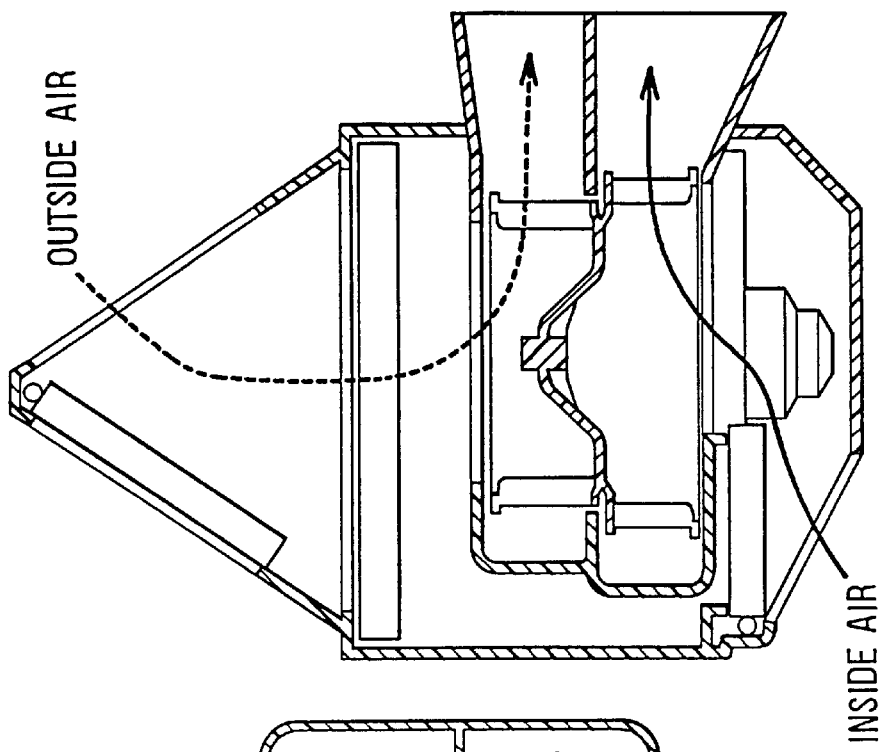
FIG. 21B is a cross sectional view of the blower unit in a switching process between the whole outside air mode and the double laminar mode according to a comparison sample.
Figure 21A:
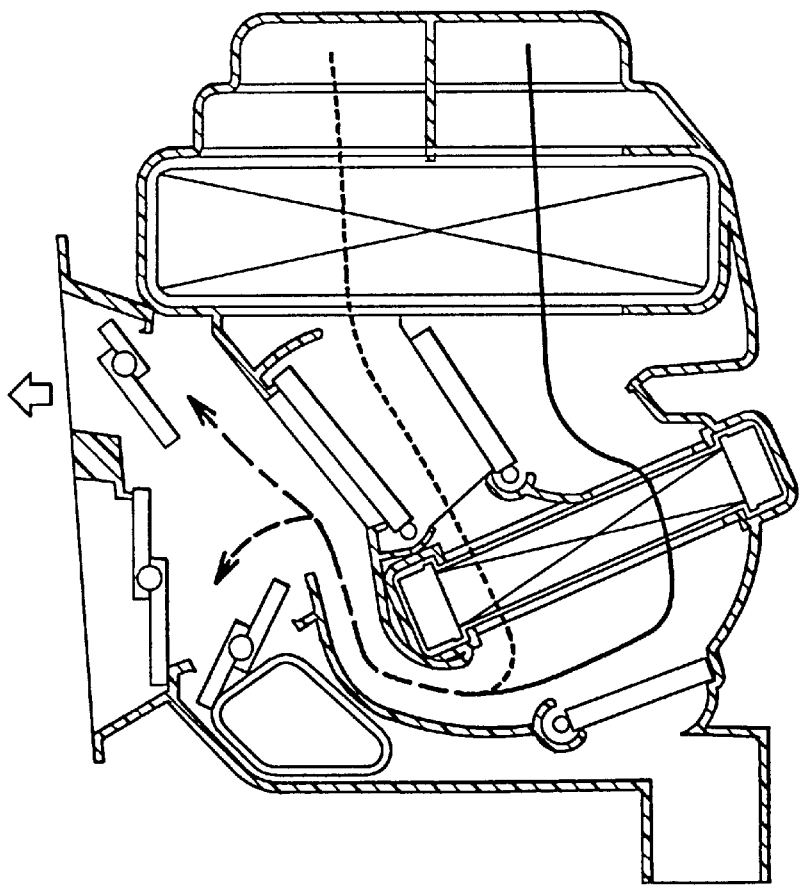
FIG. 21A is a cross sectional view of the air conditioning unit in a switching process between the whole outside air mode and the double laminar mode according to a comparison sample.

In a process for switching from the whole outside air mode in FIG. 19 to the inside air/outside air double laminar mode in FIG. 20, the inventors have examined that a state shown in FIG. 21 is set at first. FIG. 21 shows a state where the first inside air/outside air 4 is shifted to a position to open the inside air/outside air introduction port 4 prior to the warm air bypass door 22, from the state of the whole outside air mode in FIG. 19. Subsequently, the warm air bypass door 22 is shifted from this state to a position for partitioning the inside air and the outside air, as shown in FIG. 20.

However, in the switching process, if there is set the state of FIG. 21, the inside air and the outside air which are partitioned to the upstream side of the heater core 13 are mixed in the first warm air passage 19a at the downstream side of the heater core 13. Therefore, it turns out that, the air having a high-humidity, which is produced by mixing the inside air and the outside air, flows into the defroster opening portion 25 temporarily, with the result that the windshield may be frosted or clouded.

Conversely, in the switching process from the inside air/outside air double laminar mode in FIG. 19 to the whole outside air mode in FIG. 20, when the warm bypass door 22 is shifted to the normal position (the position where the inlet portion 21 of the second warm air passage 30 is closed) prior to the first inside air/outside air switching door 4, similarly, the air having a high-humidity, which is produced by mixing the inside air and the outside air, flows into the defroster opening portion 25 temporarily.

In the second embodiment, when the state of the whole outside air mode in FIG. 19 is switched to the state of the inside air/outside air double laminar mode in FIG. 20, the warm air bypass door 22 is always shifted to the position for partitioning the inside air and the outside air before the first inside air/outside air switching door 4, as shown in FIG. 22. In this way, because the outside air flows into each of the defroster opening portion 25, and the foot opening portions 29 and 33, there is no possibility that the windshield is frosted or clouded.

Conversely, when the state of the inside air/outside air double laminar mode in FIG. 20 is switched to the state of the whole outside air mode in FIG. 19, the first inside air/outside air switching door 4 is always shifted to the position where the first inside air introduction port 2 is closed before the warm air bypass door 22 is shifted, as shown in FIG. 22. In this way, because the outside air flows into each of the opening portions 25, 29 and 33, there is no possibility that the windshield is frosted or clouded.

As described above, when the whole outside air mode and the inside air/outside air double laminar mode are switched, by defining the switching order of the first inside air/outside air switching door 4 and the warm air bypass door 22, it is possible to certainly prevent the windshield from being frosted or clouded in the switching process.

The above-described door switching order is defined specifically by electrically controlling an operation of the servomotor (actuator) for actuating each door.

FIG. 23 is a system view showing briefly an electric control in the second embodiment. Temperature control means in the form of an electronic control apparatus 50 is constructed by a microcomputer and the like, and each of various sensor signals from a group of sensors 51 and each of various operation signals from a group of operation members 52 provided on an air conditioning operation panel (not shown) are input to the electronic control apparatus 50.

Each of various air conditioning components including a servomotor 53 for actuating the first inside air/outside air switching door 54 and the inside air/outside air switching door 5 through a link mechanism, and a servomotor 54 for interlockingly actuating the main air mixing door 17 and the auxiliary air mixing door 18 are controlled by the electronic control apparatus 50. The servomotor 54 actuates the warm air bypass door 22 in an area at a side of the maximum heating operation, which exceeds a range of a predetermined rotational angle for actuating both of the air mixing doors 17 and 18. Such a door actuating mechanism has been described as a modification of the door actuating mechanism in the first embodiment. A servomotor 55 is for interlockingly actuating the defroster door 26, the face door 31, and the foot door 310.

The air conditioning electronic control apparatus 50 performs calculation processes in accordance with each of input signals based on a preset program stored in the ROM to control an operation of each of various components (the above-described doors and the like), and only the control portion relative to the second embodiment will be described. First calculating means 56 is for calculating a target air temperature TAO of the air blown into the passenger compartment, which is necessary to maintain the passenger compartment at a set temperature. The first calculating means 56 calculates the target air temperature TAO based on the following formula (1) pre-stored in the ROM.

$$TAO = Kset \times Tset - Kr \times Tr - Kam \times Tam - Ks \times Ts + C \quad (1)$$

wherein, Tset is a set temperature set by an operation member of the air conditioning operation panel, for setting a temperature, Tr is a temperature of the inside air, detected by an inside air temperature sensor, Tam is a temperature of the outside air, detected by an outside air temperature sensor, and Ts is an amount of sunlight, detected by a sunlight sensor. Further, Kset, Kr, Kam, and Ks are gains, and C is a constant for correction.

Control means 57 is for controlling the electric motor 42 for the blower fan. The control means 57 determines a fan motor voltage in corresponding with TAO, based on a map pre-stored in the ROM, and applies the voltage to the motor 42. Second calculating means 58 is for calculating a temperature control calculation value SW to determine each target opening degree of the air mixing doors 17 and 18. The second calculating means 58 calculates the temperature control calculation value SW based on the following formula (2) pre-stored in the ROM.

$$SW = [(TAO - Te)/(Tw - Te)] \times 100 (\%) \quad (2)$$

wherein, Tw is a temperature of the cooling water flowing into the heater core 13, detected by a water temperature sensor, and Te is a temperature of air blown out from the evaporator 12, detected by an evaporator blown-air temperature sensor.

Control means 59 is for controlling the servomotor 53 for actuating the inside air/outside air switching doors 4 and 5. The control means 59 controls an electric current supplied to the servomotor 53 in correspondence with the temperature control calculation value SW, based on a map pre-stored in the ROM, to determine a rotational angle of the motor.

Control means 60 is for controlling the servomotor 54 for actuating the air mixing doors 17 and 18 and the warm air bypass door 22. The control means 60 controls an electric current supplied to the servomotor 54 in correspondence with the temperature control calculation value SW, based on a map pre-stored in the ROM, to determine a rotational angle of the motor.

Control means 61 is for controlling the servomotor 55 for actuating the air outlet mode doors 26, 31, and 310. The control means 61 controls an electric current supplied to the servomotor 55 in correspondence with the temperature control calculation value SW, based on a map pre-stored in the ROM, to determine a rotational angle of the motor.

Figure 24:
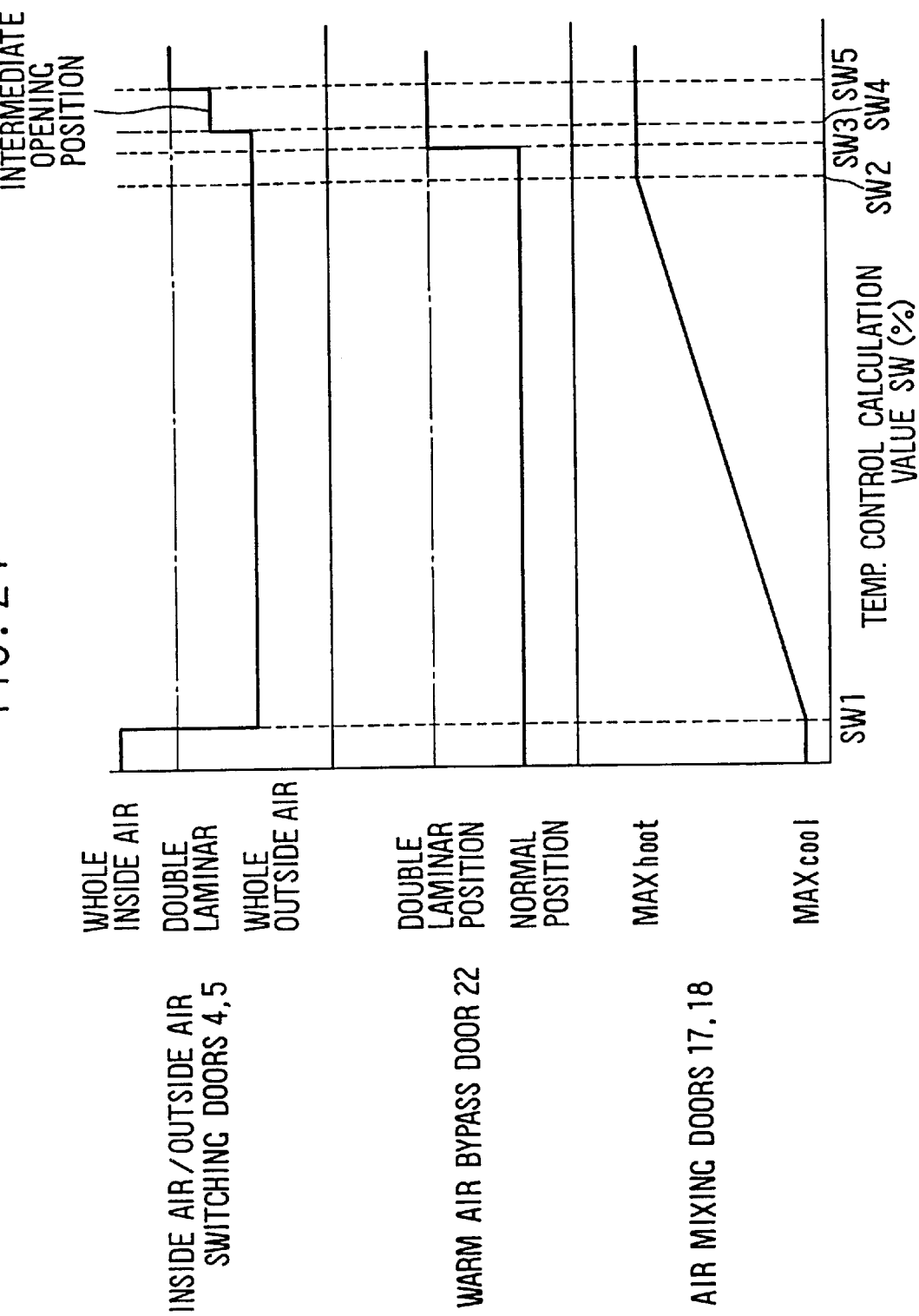
FIG. 24 is a graph showing control characteristics of door control according to the second embodiment.

FIG. 24 shows a content of the door control in correspondence with the temperature control calculation value SW in the second embodiment. Each of the doors is controlled as in FIG. 24 in any air outlet modes other than the defroster air outlet mode. In the face air outlet mode and the bi-level mode, because the maximum heating mode is not necessary, each of doors is controlled in an area where the temperature control calculation value SW is less than SW3 (SW<SW3).

The door control of FIG. 24 will be described specifically. When the temperature control calculation value SW is equal to or less than SW1, the air mixing doors 17 and 18 are operated to the maximum cooling position where the cool air bypass passage 16 is fully opened and the air passage into the heater core 13 is fully closed. Simultaneously, the warm air bypass door 22 is operated to the normal position where the inlet portion 21 is closed, and the inside air/outside air 4 and 5 are operated to the position of the whole inside air mode, where the inside air introduction ports 2 and 2a are opened and the outside introduction port 3 is closed.

When the temperature control calculation value SW exceeds the SW1 which is a sufficient small value, the first inside air/outside air switching door 4 is operated to the position of the whole outside air mode where the first inside air introduction port 2 is closed and the communication path 43 is opened, and the second inside air/outside air switching door is also operated to the position of the whole outside air mode where the second inside air introduction port 2a is closed and the outside air introduction port 3 is opened. Simultaneously, the air mixing doors 17 and 18 are operated to positions where the air passage into the heater core 13 is gradually opened.

Until the temperature control calculation value SW reaches SW2 (which is a sufficient large value as compared with the SW1) after having exceeded SW1, the warm air bypass door 22 is maintained at the normal position where the inlet portion 21 is closed, and the first and second inside air/outside air switching doors 4 and 5 are maintained at the positions of the whole outside air mode. Meanwhile, the air mixing doors 17 and 18 continuously increases the opening degree of the air passage into the heater core 13 to increase the temperature of the blown-air.

When the temperature control calculation value SW reaches SW2, the air mixing doors 17 and 18 are operated to the maximum heating positions where the cool air bypass passage 16 is fully closed and the air passage into the heater core 13 is fully opened. However, the warm air bypass door 22 is still maintained at the normal position where the inlet portion 21 is closed, and the first and second inside air/outside air switching doors 4 and 5 are also still maintained at the positions of the whole outside air mode.

When the temperature control calculation value SW reaches SW3 which is slightly larger than SW2, first, the warm air bypass door 22 is shifted from the normal position to the double laminar position. That is, the warm air bypass door 22 is operated to a position where the inlet portion 21 is opened and the first warm air passage 19a is partitioned into the first air passage 8 and the second air passage 9. At this time, because the first and second inside air/outside air switching doors 4 and 5 are still maintained at the positions of the whole outside air mode, there is no possibility that the inside air and the outside air are temporarily mixed at the downstream side of the heater core 13.

Further, when the temperature control calculation value SW exceeds SW3 and reaches SW4, the first inside air/outside air switching door 4 is shifted to the intermediate opening position to open each of the first inside air introduction port 2 and the communication path 43 by the intermediate opening degree.

When the temperature control calculation value SW exceeds SW4 and reaches SW5, the first inside air/outside air switching door 4 fully opens the first inside air introduction port 2 and fully closes the communication path 43. Because the second inside air/outside air switching door 4 is maintained in a range of SW>SW1 to always open the outside air introduction port 3, the inside air/outside air introduction portion of the blower unit 1 is not shifted to the position of the inside air/outside air double laminar until SW>SW5. That is, the timing (SW5) when the inside air/outside air introduction port of the blower unit 1 is operated to the double laminar position is behind the timing (SW3) when the warm air bypass door 22 is switched from the normal position to the double laminar position.

Conversely, when the inside air/outside air double laminar mode is switched to the whole outside air mode, at the time of SW5, first, in the inside air/outside air introduction port of the blower unit 1, the first inside air/outside air switching door 4 is shifted to the intermediate opening position. Subsequently, at the time of SW4, the first inside air/outside air switching door 4 fully closes the first inside air introduction port 2 and fully opens the communication path 43, so that the inside air/outside air introduction portion of the blower unit 1 is switched to the whole outside air mode.

However, at this time, because the warm air bypass passage 22 is still maintained at the double laminar position, there is no possibility that the inside and the outside air are temporarily mixed at the downstream side of the heater core 13. Subsequently, at the time of SW3, the warm air bypass door 22 is recovered from the double laminar position to the normal position.

The reason why the intermediate opening position where the first inside air/outside air switching door 4 opens each of the first inside air introduction port 2 and the communication path 43 is provided between the whole outside air mode and the double laminar mode in FIG. 24 is as follows. That is, when the inside air/outside air mode is switched directly between the whole outside air mode and the double laminar mode, the temperature, the amount, and the like, of the air blown into the passenger compartment, may vary suddenly. Therefore, by setting the intermediate opening position, it is possible to slacken the sudden variation of the temperature, the amount, and the like, due to the switching of the inside air/outside air mode.

The necessity for setting the intermediate opening position varies dependent on the specification of the ventilation system of the air conditioning apparatus; however, because the second embodiment has an object to prevent the windshield from being frosted or clouded when the inside air/outside air double laminar mode and the whole outside air mode are switched, it is not always necessary to set the intermediate opening position.

As described above, the door control in the other air outlet modes than the defroster air outlet mode is performed as shown in FIG. 24; however, in the defroster air outlet mode, independently of the temperature control calculation value SW, the whole outside air mode is always maintained to defrost the windshield.

A third embodiment of the present invention will be described with reference to FIGS. 25 and 26.

Figure 25:
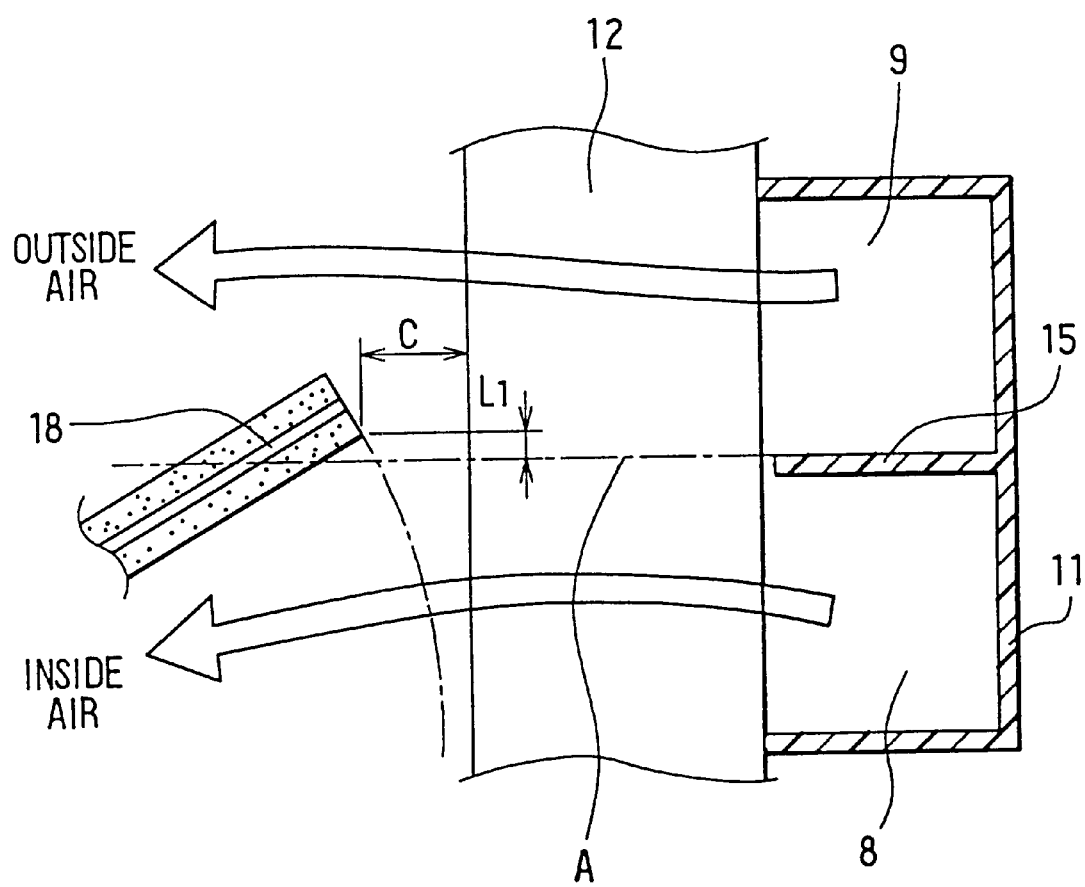
FIG. 25 is an enlarged view showing a gap at a top end portion of the auxiliary air mixing door according to a third embodiment of the present invention.

FIG. 25 is an enlarged view showing the top end portion of the auxiliary air mixing door 18 in FIG. 15A. The inventors of the present invention have variously examined and studied a correlation between a gap C generated between the top end portion of the auxiliary air mixing door 18 and the evaporator 12 at the position where the auxiliary air mixing door 18 is stopped in the double laminar mode and the defrosting performance of the windshield of the vehicle. As a result, the inventors found out that, by setting the gap C to a predetermined value, more specifically, 13 mm or less, the defrosting performance of the windshield can be secured satisfactorily.

Figure 26:
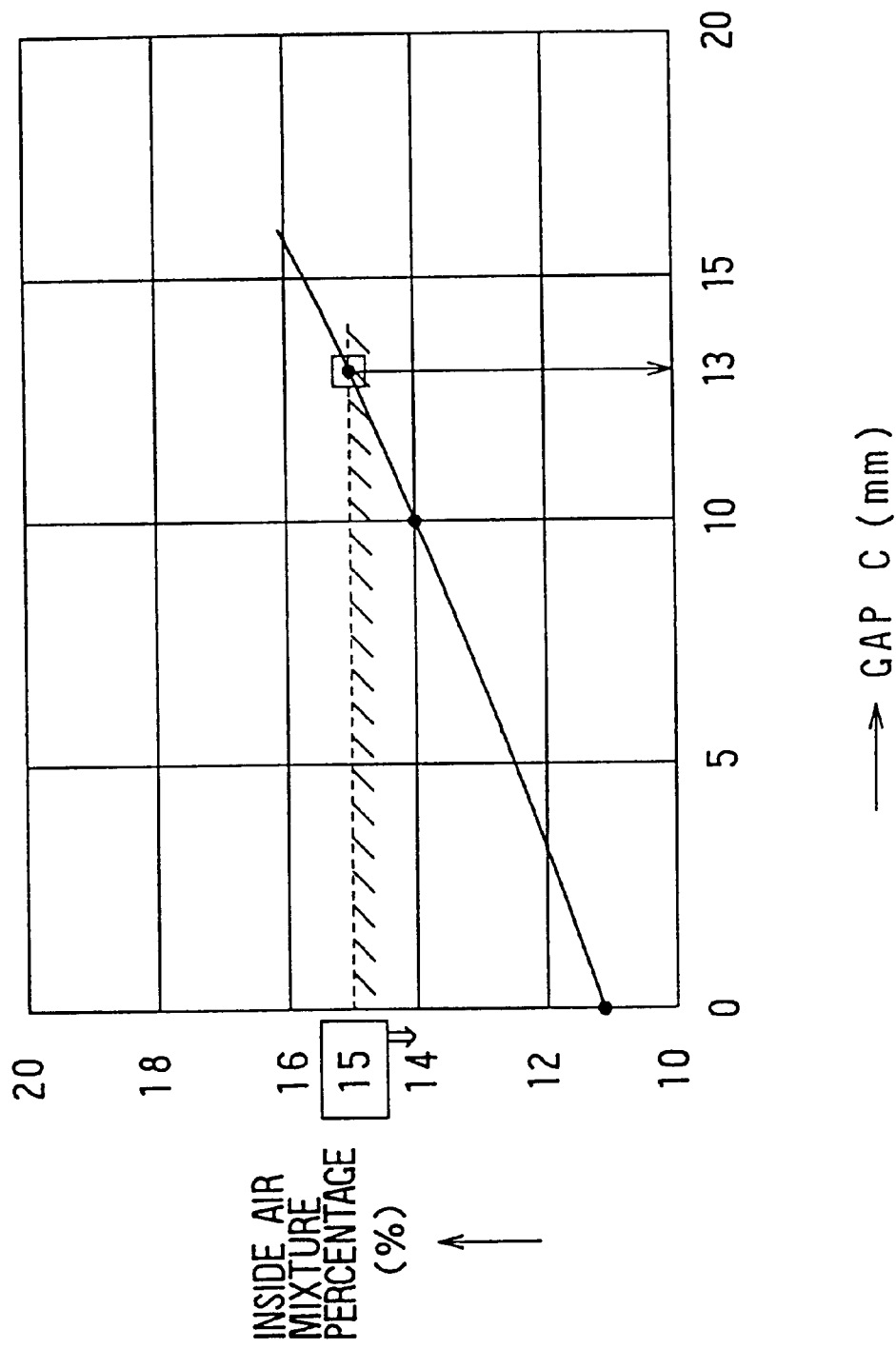
FIG. 26 is a graph showing a relationship between the gap at the top end portion of the auxiliary air mixing door and an inside air mixture percentage, according to the third embodiment.

That is, FIG. 26 shows data of an experiment result, showing a relationship between the gap C generated at the top end portion of the auxiliary air mixing door 18 and an inside air mixture percentage into the second air passage 9 at the side of the outside air. According to the examinations and studies by the inventors, it has been confirmed that, by suppressing the inside air mixture percentage into the second air passage 9 to be equal to 15% or less, a preferable field of vision of the windshield, which does not impede the driving of the vehicle (i.e., more than 90% of the area of the windshield is clear), can be secured.

The experiments have been performed on the following conditions:

Outside air temperature: 0° C.
Outside air relative humidity: 90%
Inside air temperature: 25° C.
Number of passengers: 5 people
Total air amount in the double laminar mode: 200 m³/h
Outside air percentage: 55%
Inside air percentage: 45%

Here, the inside air mixture percentage is expressed the following formula (3)

$$\text{Inside air mixture percentage} = X/Y \qquad (3)$$

wherein, $X$=absolute humidity of the air blown out from the defroster air outlet−absolute humidity of the sucked outside air, and $Y$=absolute humidity of the sucked inside air−absolute humidity of the sucked outside air.

As being understood from the experiment result of FIG. 26, it has turned out that, by setting the gap C within 13 mm, the inside air mixture percentage can be suppressed to be equal to 15% or less.

By setting the inside air mixture percentage to be equal to 15% or less, more than 90% of the area of the windshield is made clear, so that the defrosting performance of the windshield can be secured satisfactorily.

In the third embodiment, the gap C at the top end portion of the auxiliary air mixing door 13 in the double laminar mode is set to be equal to 13 mm or less; however, a gap at the top end portion of the warm air bypass door 22 in the double laminar mode is specifically set to approximately 3 mm, because it is structurally easy to set the gap at the top end portion of the warm air bypass door 22 to be equal to 13 mm or less.

A fourth embodiment of the present invention will be described with reference to FIGS. 27 to 29.

In the first embodiment, as shown in FIGS. 10–14, the warm air bypass door 22 is actuated by the actuating mechanism (the link mechanism 60 and the actuating servomotor 70) provided independently of the actuating mechanism (the link mechanism 40 and the actuating servomotor 50) of both air mixing doors 17 and 18; however, the warm air bypass door 22 can be actuated by a common actuating servomotor with both air mixing doors 17 and 18.

Figure 27:
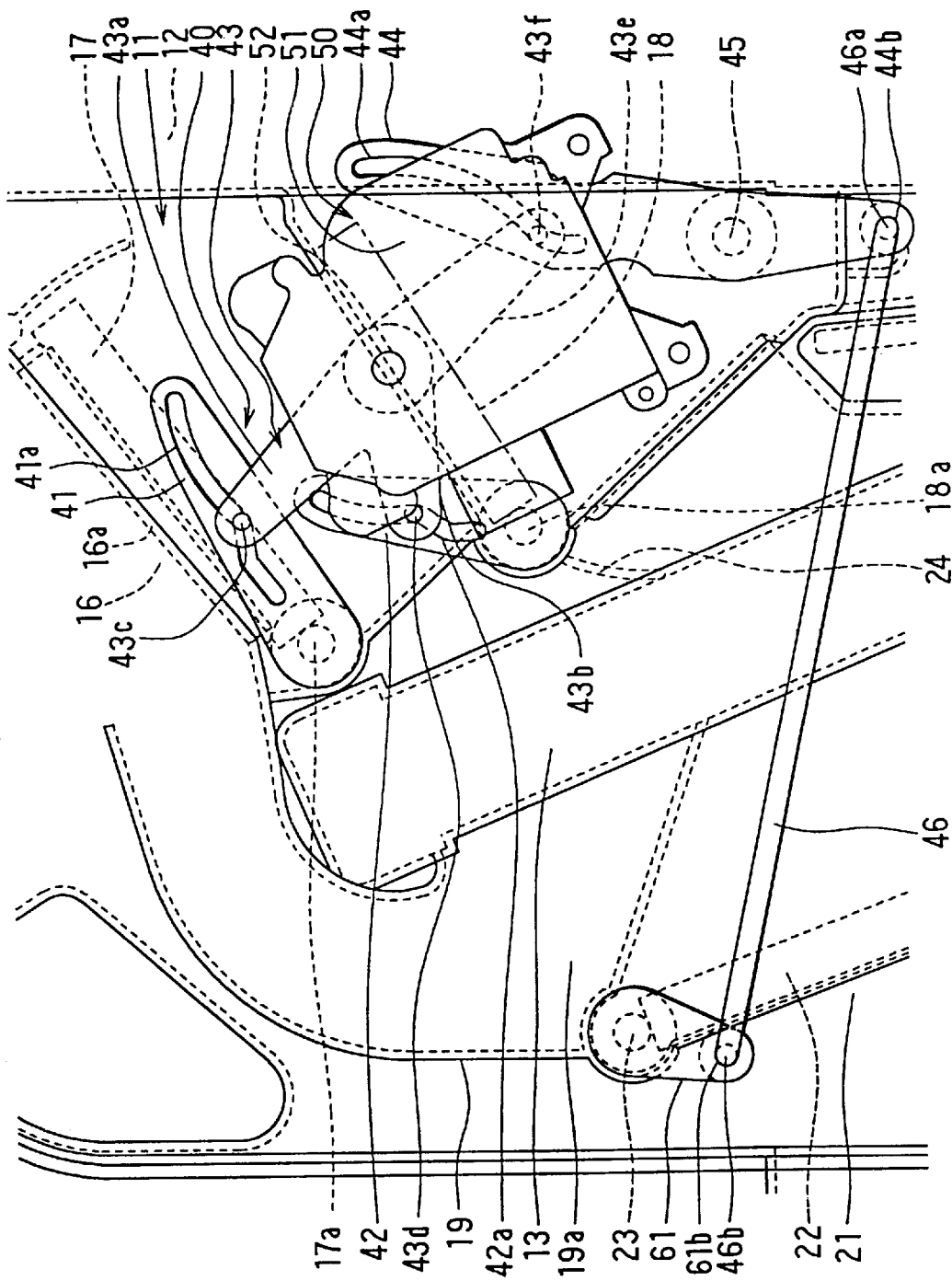
FIG. 27 is an enlarged view showing an actuating mechanism of an air mixing door and a warm air bypass door in the normal maximum heating state, according to a fourth embodiment of the present invention.
Figure 28:
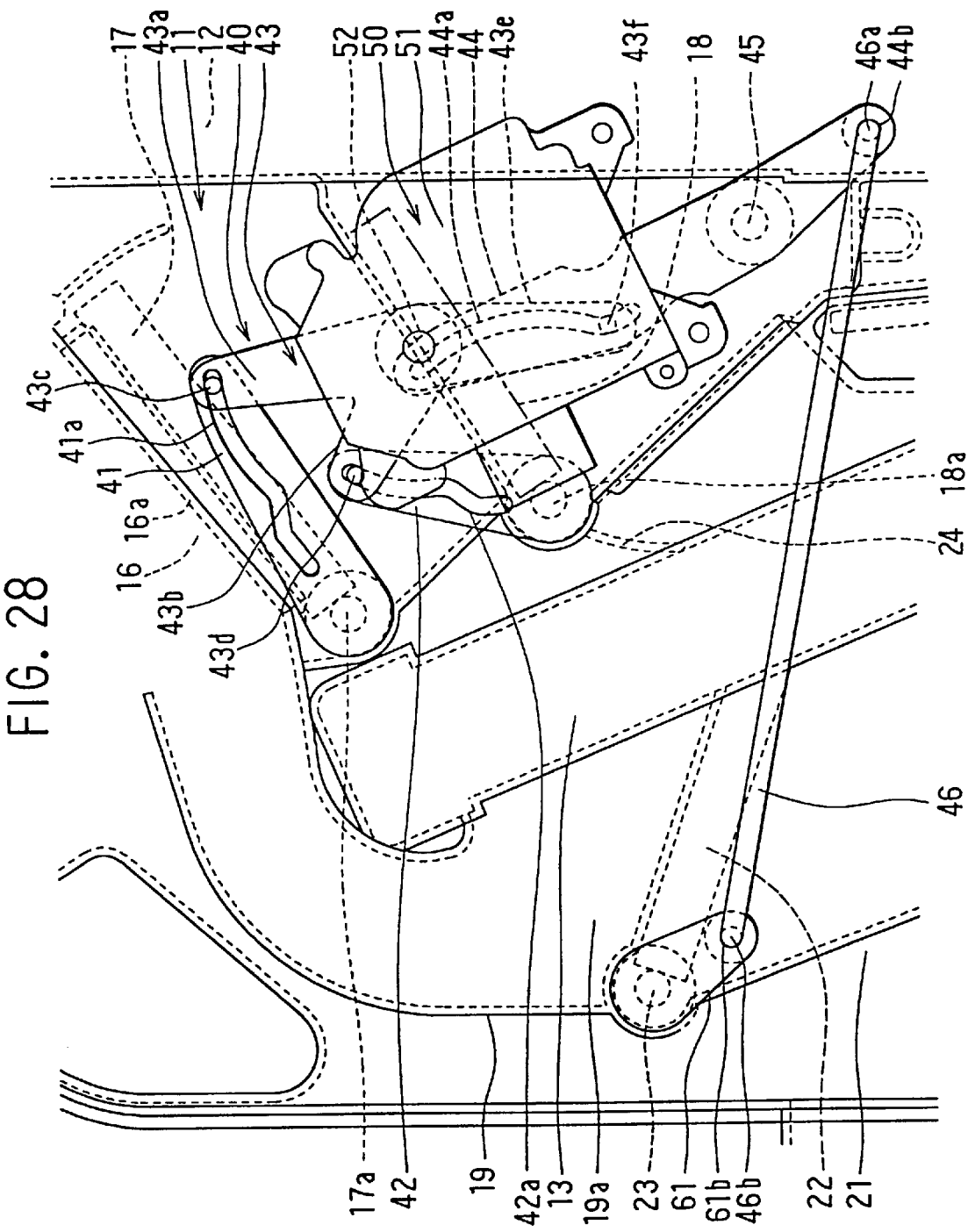
FIG. 28 is an enlarged view showing the door actuating mechanism of FIG. 27 in the double laminar mode, according to the fourth embodiment.

FIGS. 27 and 28 show an actuating mechanism for actuating the warm air bypass door 22 and both air mixing doors 17 and 18 by the common servomotor 50. In FIGS. 27 and 28, parts and components similar or equivalent to those in the first embodiment are shown by the same reference numerals, and explanations thereof are omitted.

To the output shaft 52 of the common actuating servomotor 50, there is connected the link mechanism 40 which will be described below. That is, the rotation center portion of the actuating link lever 43 is integrally connected to the output shaft 52, and the lever 43 is integrally formed with three of first to three lever portions 43a, 43b, and 43e. At the top end portions of the first to third lever portions 43a, 43b, and 43e, there are integrally provided pin portions 43c, 43d, and 43f, respectively.

The pin portions 43c and 43d are slidably fitted in cam grooves 41a and 42a of the driven link levers 41 and 42 connected to the rotary shafts 17a and 18a of the air mixing doors 17 and 18, respectively.

The pin portion 43f is slidably fitted in a cam groove 44a provided at one end side of the a middle link lever 44. The middle link lever 44 is rotatably provided onto an outer wall surface of the air conditioning case 11 with a rotary shaft 45 as a center thereof. At the other end side of the middle link lever 44, there is provided a connection hole 44b.

Into the connection hole 44b, there is rotatably fitted a folded end portion 46a provided at one end of a middle connection stick 46. A folded end portion 46b provided at the other end of the middle connection stick 46 is rotatably fitted in a connection hole 61b provided in the driven link lever 61 of the warm air bypass door 22.

FIG. 27 shows the maximum heating state (the normal maximum heating state) in the air outlet modes (e.g., the defroster air outlet mode) other than the foot air outlet mode and the foot/defroster air outlet mode. In this state, by the rotation of the output shaft 52 of the servomotor 50, both air mixing doors 17 and 18 are rotated to the maximum heating position through the link mechanism 40.

In contrast, the warm air bypass door 22 is maintained to close the warm air bypass inlet portion 21.

FIG. 28 shows the maximum heating state in the double laminar mode, i.e., in the foot air outlet mode or the foot/defroster air outlet mode. In this state, the output shaft 52 of the servomotor 50 is further rotated by a predetermined amount from the normal maximum heating state in FIG. 27. That is, even if the output shaft 52 of the servomotor 50 is rotated from the normal maximum heating state and the actuating link lever 43 is rotated, the fitting states between the pin portions 43c and 43d of the first and the second lever portions 43a and 43b of the actuating link lever 43 and the cam grooves 41a and 42a of the driven link levers 41 and 42 are in idling. Therefore, the driven link levers 41 and 42 do not rotate, and both air mixing doors 17 and 18 are maintained at the maximum heating position.

On the other hand, the third lever portion 43e of the actuating link lever 43 rotates the middle link lever 44 to the position of FIG. 28. Therefore, the driven link lever 61 is rotated to the position of FIG. 28 through the middle connection stick 46, and the warm air bypass door 22 is rotated to the partition position between the first air passage 8 at the side of the inside air and the second air passage 9 at the side of the outside air. In this way, the double laminar mode can be set by using the single common servomotor 50.

In FIG. 12, the position of the actuating angle=90° corresponds to the normal maximum heating state in FIG. 27, and the position of the actuating angle=120° corresponds to the maximum heating state (double laminar mode) in the foot air outlet mode or the foot/defroster air outlet mode in FIG. 28.

Figure 29:
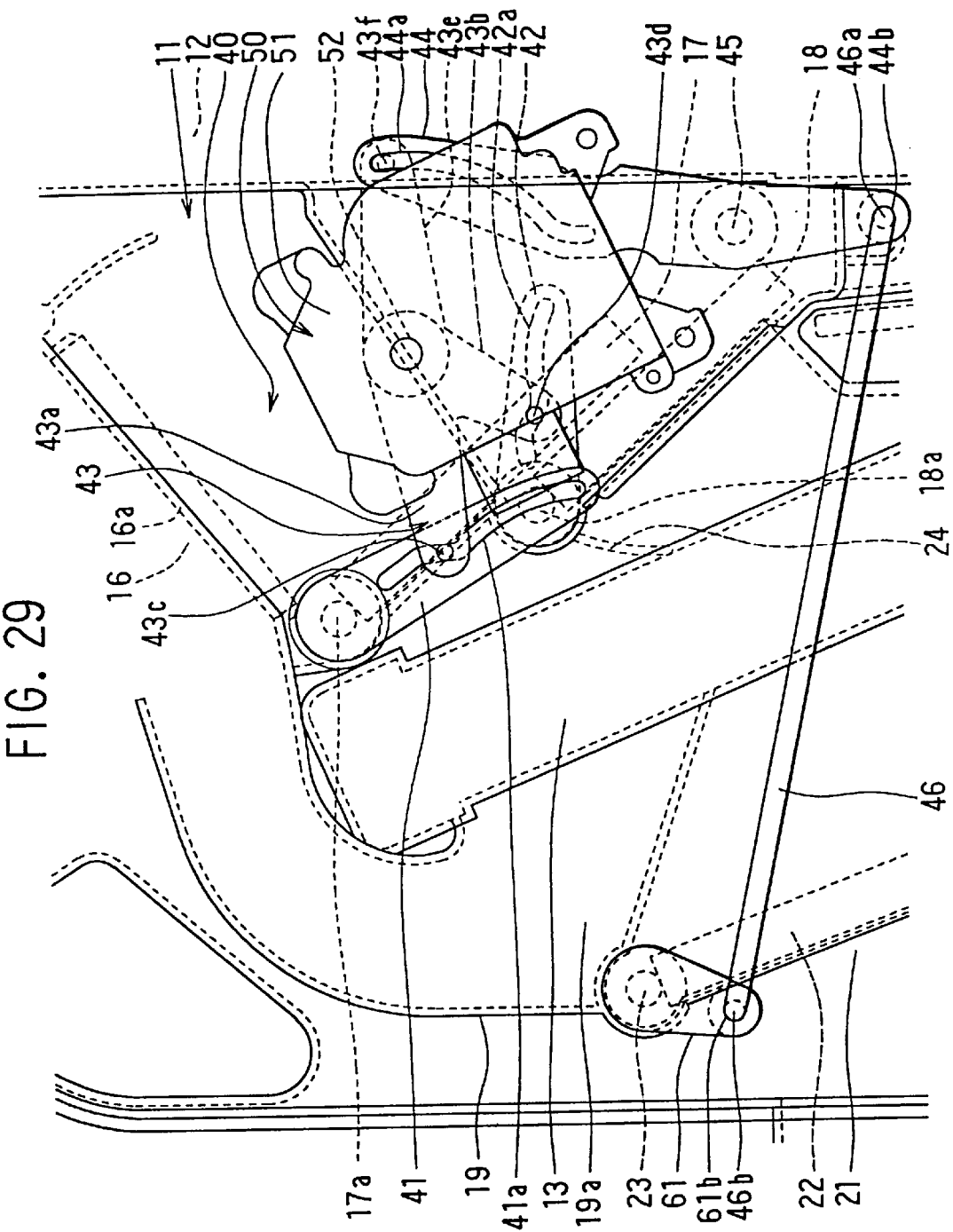
FIG. 29 is an enlarged view showing the door actuating mechanism of FIG. 27 in the maximum cooling state, according to the fourth embodiment.

FIG. 29 heater core 13 is fully closed and the warm air bypass door 22 closes the warm air bypass inlet portion 21.

In the above-described embodiments, each of the doors 4, 5, 17, 18, 22, 26, 31, 36, 310, and 312 is operated by an actuator such as a servomotor through a link mechanism; however, each door may be manually operated by a manual operation member provided on an air conditioning operation panel, such as an inside air/outside air introduction setting lever, a temperature control lever, and an air outlet mode lever.

In the above-described embodiments, the warm air bypass door 22 is actuated by an actuating mechanism independently of the air mixing doors 17 and 18; however, the rotary shaft 23 of the warm air bypass door 22 is connected to the link mechanism of the air mixing doors 17 and 18, so that the warm air bypass door 22 and the air mixing doors 17 and 18 can be actuated by the common actuator.

In this case, in the air outlet mode other than the foot air outlet mode and the foot/defroster air outlet mode, e.g., the defroster air outlet mode, even if both air mixing doors 17 and 18 are in the maximum heating state, the warm air bypass door 22 is maintained at the position (two-dot chain line of FIG. 2) where the warm air bypass inlet portion 21 is closed. That is, the rotating amount of the servomotor for actuating the air mixing door in the maximum heating operation during the foot air outlet mode and the foot/defroster air outlet mode may be changed from that during the other air outlet modes.

The maximum heating operation when the double laminar mode is set is not strictly limited to the case where the air mixing doors 17 and 18 are operated to the positions to completely prevent the cool air from bypassing; however, it may include a case where positions of the air mixing doors 17 and 18 allow a slight amount of the cool air to bypass.

In each of the first and the second embodiment, the evaporator (cooling heat exchanger) 12 is disposed in the air conditioning unit 100; however, the present invention may be employed in an air conditioning apparatus without having the cooling heat exchanger.

Further, in each of the first and the second embodiments, as temperature adjusting means for adjusting a heating amount of conditioned air in the heater core 13 to adjust a temperature of air, the air mixing doors 17 and 18 for adjusting an air amount ratio of cool air and warm air are employed; however, instead of the air mixing doors 17 and 18, by using a hot water valve for adjusting an amount of hot water flowing into the heater core 13 or a temperature of the hot water, the present invention can be also employed in an air conditioning apparatus in which a temperature of the air is adjusted by a function for adjusting the flow amount (or the temperature) of the hot water, of the hot water valve.

Still further, the present invention may be also employed in an air conditioning apparatus in which the rear-seat foot opening portion 33 in each of the first and the second embodiments is eliminated.

In each of the above-described embodiments, as for the air mixing doors 17 and 18 having the rotating areas 17b and 18b which are partially overlapped with each other, there is provided the level difference 11b for forming a sealing surface of the auxiliary air mixing door 18; however, the level difference 11b is not limited to the case where the rotating areas of the air mixing doors 17 and 18 are overlapped, but may be provided in a case where rotating areas of doors such as the air outlet mode doors 26 and 31 are overlapped with each other.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. An air conditioning apparatus for a vehicle having a passenger compartment, said air conditioning apparatus comprising:

an air conditioning case for forming an air passage, said air conditioning case having a first opening portion for blowing air toward a lower portion of the passenger compartment and a second opening portion for blowing air toward an inner surface of a windshield;

a heating heat exchanger for heating air passing through said air passage, said heating heat exchanger being disposed in said air conditioning case approximately vertically;

temperature control means for adjusting a heating amount by said heating heat exchanger to control a temperature of the air;

partitioning means for partitioning said air passage into a first air passage through which inside air flows and a second air passage through which outside air flows to set a double laminar mode when said temperature control means is controlled to maximize the heating amount during an air outlet mode where both of said first opening portion and said second opening portion are opened in such a manner that said first air passage is communicated with said first opening portion and said second air passage is communicated with said second opening portion;

a first warm air passage for introducing the warm air having passed through said heating heat exchanger into said first and second opening portions, said first warm air passage being defined by a partition wall of said partition means to extend upwardly from an immediately downstream side of said heating heat exchanger;

a second warm air passage for introducing the warm air having passed through said heating heat exchanger directly into said first opening portion while bypassing said first warm air passage, said second warm air passage having an inlet portion opposite to said heating heat exchanger;

a communication path provided at an upper side of said partition wall, through which said first warm air passage and said second warm air passage communicate with each other; and a warm air bypass door for opening and closing said inlet portion of said second warm air passage, said warm air bypass door being operated between a first position where said inlet portion is opened and said first warm air passage is partitioned into said first air passage and said second air passage so that warm air having passed through an upper part of said heating heat exchanger is introduced toward an upper side through said first warm air passage while warm air having passed through a lower part of said heating heat exchanger is introduced into said second warm air passage through said inlet portion in said double air laminar mode, and a second position where said inlet portion is closed so that all warm air having passed through said heating heat exchanger is introduced toward the upper side through said first warm air passage, wherein:

said second warm air passage is branched from said inlet portion into a front passage extending upwardly from said inlet portion, and a rear passage extending approximately horizontally from said inlet portion; and said first opening portion includes a front-seat foot opening which is provided to communicate with said front passage of said second warm air passage, and a rear-seat foot opening which is provided to communicate with said rear passage of said second warm air passage.

2. An air conditioning apparatus according to claim 1, wherein, said air conditioning case has an inside air introduction port provided at an inlet portion of said first air passage and an outside air introduction port provided at an inlet portion of said second air passage, said air conditioning apparatus further comprising:

an inside air/outside air switching door for opening and closing said inside air introduction port and said outside air introduction port.

3. An air conditioning apparatus according to claim 2, wherein, when a whole outside air mode where the outside air is introduced from both of said first air passage and said second air passage is switched to said double laminar mode where the inside air and the outside air are introduced into said first air passage and said second air passage, respectively, said inside air/outside air switching door is operated to a position of said double laminar mode after said warm air bypass door is operated to a position of said double laminar mode, and when said double laminar mode is switched to said whole outside air mode, said warm air bypass door is operated to a normal position where said inlet portion is closed after said inside air/outside air switching door is operated to a position of said whole outside air mode.

4. An air conditioning apparatus according to claim 3, further comprising:

a first actuator for actuating said inside air/outside air switching door;

a second actuator for actuating said warm air bypass door;

calculating means for a temperature control calculation value for controlling said temperature adjusting means; and control means for controlling said first and said second actuators based on said temperature control calculation value.

5. An air conditioning apparatus according to claim 1, further comprising:

a cool air bypass passage through which air bypasses said heating heat exchanger; and a cool air/warm air mixing space for mixing the cool air from said cool air bypass passage and the warm air from said first warm air passage, said cool air/warm air mixing space being provided adjacent to said communication path, wherein said temperature adjusting means is an air mixing door for adjusting a ratio of an amount of air passing through said heating heat exchanger and an amount of air passing through said cool air bypass passage.

6. An air conditioning apparatus according to claim 1, wherein, said first opening portion includes a front-seat foot opening portion and a rear-seat foot opening portion, both of which are in communication with each other through said second warm air passage, said inlet portion of said second warm air passage is disposed to face a surface at an air downstream side, of said heating heat exchanger, and said rear-seat foot opening portion is disposed at a position immediately after said inlet portion.

7. An air conditioning apparatus according to claim 1, wherein a stop position of said warm air bypass door in said double laminar mode is set in such a manner that a top end portion of said warm air bypass door is shifted into an area of said second air passage by a predetermined distance.

8. An air conditioning apparatus according to claim 1, further comprising:

a blower unit for blowing air while partitioning inside air and outside air;

a cool air bypass passage through which air bypasses said heating heat exchanger;

a main air mixing door disposed at an air upstream side of said heating heat exchanger, for adjusting a ratio of an amount of air passing through said heating heat exchanger and an amount of air passing through said cool air bypass passage;

an auxiliary air mixing door disposed at an air upstream side of said heating heat exchanger and operated with said main air mixing door, for adjusting a ratio of an amount of air passing through said heating heat exchanger and an amount of air passing through said cool air bypass passage; and an air conditioning unit including said air conditioning case and disposing therein said heating heat exchanger, means for forming said cool air bypass passage, said main air mixing door, and said auxiliary air mixing door, wherein said main air mixing door fully closes said cool air bypass passage and said auxiliary air mixing door partitions a space at an air upstream side of said heating heat exchanger into said first air passage and said second air passage in said air conditioning case in said double laminar mode.

9. An air conditioning apparatus according to claim 8, wherein, rotating areas of said main air mixing door and said auxiliary air mixing door are partially overlapped with each other, and wall surfaces of said first and said second air passages have a level difference at a portion where said rotating areas are overlapped, said level difference contacting only said auxiliary air mixing door without contacting said main air mixing door and forming a sealing surface when said auxiliary air mixing door is stopped.

10. An air conditioning apparatus according to claim 1, wherein:

said warm air bypass door is operated to said first position to partition said first air passage and said second air passage from each other only when said double laminar mode is set during the maximum heating; and said warm air bypass door is operated to said second position so that said first air passage and said second air passage communicate with each other when the maximum heating is released.

11. An air conditioning apparatus according to claim 1, wherein:

said partitioning means includes a movable partition member disposed at an upstream air side of said heating heat exchanger;

said movable partition member is operated to partition an upstream air passage of said heating heat exchanger into said first air passage and said second air passage when said double laminar mode is set during the maximum heating; and said movable partition member is operated to communicate said first air passage and said second air passage in the upstream air passage of said heating heat exchanger when the maximum heating is released.

12. An air conditioning apparatus according to claim 1, wherein said air conditioning case is disposed under an instrument panel of the vehicle.

13. An air conditioning apparatus according to claim 8, wherein:

said main air mixing door is rotated around a first rotation shaft;

said auxiliary air mixing door is rotated around a second rotation shaft; and said first rotation shaft and said second rotation shaft are disposed parallel to each other to extend approximately horizontally.

14. An air conditioning apparatus for a vehicle having a passenger compartment, said air conditioning apparatus comprising:

an air conditioning case for forming an air passage, said air conditioning case having a first opening portion for blowing air toward a lower portion of the passenger compartment and a second opening portion for blowing air toward an inner surface of a windshield;

a heating heat exchanger for heating air passing through said air passage;

a cool air bypass passage through which air bypasses said heating heat exchanger;

an air mixing door for adjusting a ratio of an amount of air passing through said heating heat exchanger and an amount of air passing through said cool air bypass passage, said air mixing door including a main air mixing door rotated around a first rotation shaft at an air upstream side of said heating heat exchanger, and an auxiliary air mixing door rotated around a second rotation shaft at an air upstream side of said heating heat exchanger and operated with said main air mixing door;

partitioning means for partitioning said air passage into a first air passage through which inside air flows and a second air passage through which outside air flows in the maximum heating operation where said air mixing door is operated to fully close said cool air bypass passage during an air outlet mode where both of said first opening portion and said second opening portion are opened, in such a manner that said first air passage is communicated with said first opening portion and said second air passage is communicated with said second opening portion;

wherein said main air mixing door fully closes said cool air bypass passage and said auxiliary air mixing door partitions a space at an air upstream side of said heating heat exchanger into said first air passage and said second air passage in a double laminar mode where said first air passage and said second air passage are partitioned; and wherein said first and second rotation shafts are disposed approximately parallel to an extending direction of said partition means;

wherein a stop position of said auxiliary air mixing door in said double laminar mode is set in such a manner that a top end portion of said auxiliary air mixing door is shifted by a predetermined distance into an area of said second air passage.

15. An air conditioning apparatus according to claim 14, wherein, said main air mixing door and said auxiliary air mixing door are rotated to predetermined positions, respectively, not to interfere with each other, and in the maximum cooling operation, by a combination operation of said main air mixing door and said auxiliary air mixing door, an air passage into said heating heat exchanger is fully closed and said cool air bypass passage is fully opened.

16. An air conditioning apparatus according to claim 15, further comprising:

a link mechanism for interlockingly operating said main air mixing door and said auxiliary air mixing door; and an actuator for commonly actuating said main air mixing door and said auxiliary air mixing door through said link mechanism.

17. An air conditioning apparatus according to claim 14, further comprising:

a cooling heat exchanger disposed in said air conditioning case adjacent an air upstream side of said heating heat exchanger, for cooling air;

wherein, said heating heat exchanger and is disposed in said air conditioning case, and said auxiliary air mixing door functions as a movable partition member for partitioning an air passage between said heating heat exchanger and said cooling heat exchanger into said first air passage and said second air passage.

18. An air conditioning apparatus according to claim 17, wherein:

said heating heat exchanger is disposed at a vehicle rear side and said cooling heat exchanger is disposed at a vehicle front side from said heating heat exchanger;

said first air passage is disposed at a vehicle lower side and said second air passage is disposed at a vehicle upper side and said auxiliary air mixing door is disposed at a vehicle lower side from said main air mixing door; and said main air mixing door and said auxiliary air mixing door are rotated in a vertical direction of the vehicle.

* * * * *